US009781979B2

(12) United States Patent
Minato et al.

(10) Patent No.: US 9,781,979 B2
(45) Date of Patent: *Oct. 10, 2017

(54) MOLDED SURFACE FASTENER

(71) Applicant: YKK Corporation, Tokyo (JP)

(72) Inventors: Tsuyoshi Minato, Macon, GA (US); Zhiyu Ren, Toyama (JP); Mineto Terada, Toyama (JP); Shinichi Imai, Toyama (JP); Kenji Okuda, Toyama (JP); Atsushi Nakaya, Toyama (JP); Yasuhiro Sugahara, Macon, GA (US)

(73) Assignee: YKK Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,400

(22) Filed: May 4, 2016

(65) Prior Publication Data

US 2016/0242512 A1    Aug. 25, 2016

Related U.S. Application Data

(62) Division of application No. 14/354,231, filed as application No. PCT/JP2011/074695 on Oct. 26, 2011, now Pat. No. 9,357,815.

(51) Int. Cl.
*A44B 18/00* (2006.01)
*F16B 1/00* (2006.01)

(52) U.S. Cl.
CPC ...... *A44B 18/0049* (2013.01); *A44B 18/0061* (2013.01); *A44B 18/0069* (2013.01);
(Continued)

(58) Field of Classification Search
CPC ............ Y10T 24/2792; Y10T 24/2767; Y10T 24/2725; F16B 2001/0035; F16B 1/00;
(Continued)

(56) References Cited

U.S. PATENT DOCUMENTS 6,656,563 B1    12/2003 Leach et al.
2002/0164449 A1    11/2002 Fujisawa et al.
(Continued)

FOREIGN PATENT DOCUMENTS

CN    1443111 A    9/2003
CN    1537486 A    10/2004
(Continued)

OTHER PUBLICATIONS

International Search Report, PCT Application No. PCT/JP2011/074695, mailed Jan. 31, 2012.

*Primary Examiner* — Robert J Sandy
*Assistant Examiner* — Michael Lee
(74) *Attorney, Agent, or Firm* — Kilpatrick Townsend & Stockton LLP

(57) ABSTRACT

A surface fastener member includes left and right longitudinal protective wall sections and front and rear lateral protective wall sections. Each of the lateral protective wall sections includes an outer first lateral wall section and an inner second lateral wall section. The first lateral wall section is continuously placed between the left and right longitudinal protective wall sections at a predetermined height. The second lateral wall section includes a plurality of divided lateral wall bodies which are intermittently placed along a width direction, and a plurality of second engagement elements. The distance is set smaller than a mounting pitch of the first engagement elements in the longitudinal direction of the surface fastener member. According to this, when the molded surface fastener is integrally molded on a cushion body, it is possible to prevent resin material from entering an engagement element region of the surface fastener member.

8 Claims, 10 Drawing Sheets

(52) U.S. Cl.
CPC ...... *A44B 18/0073* (2013.01); *A44B 18/0076* (2013.01); *F16B 1/00* (2013.01); *F16B 2001/0035* (2013.01); *Y10T 24/2725* (2015.01); *Y10T 24/2767* (2015.01); *Y10T 24/2792* (2015.01)

(58) Field of Classification Search
CPC ............ A44B 18/0076; A44B 18/0073; A44B 18/0069; A44B 18/0061; A44B 18/0049
See application file for complete search history.

(56) References Cited

U.S. PATENT DOCUMENTS

| | | |
|---|---|---|
| 2002/0164451 A1 | 11/2002 | Fujisawa et al. |
| 2003/0214068 A1 | 11/2003 | Fujisawa et al. |
| 2005/0160534 A1 | 7/2005 | Akeno et al. |
| 2010/0181695 A1 | 7/2010 | Murasaki et al. |
| 2011/0030176 A1 | 2/2011 | Itoh et al. |
| 2011/0062615 A1 | 3/2011 | Murasaki et al. |
| 2013/0149490 A1 | 6/2013 | Cina et al. |
| 2013/0340214 A1 | 12/2013 | Terada et al. |
| 2014/0130311 A1 | 5/2014 | Okuda et al. |
| 2015/0164186 A1 | 6/2015 | Cina et al. |
| 2015/0335106 A1 | 11/2015 | Okuda et al. |

FOREIGN PATENT DOCUMENTS

| | | |
|---|---|---|
| CN | 1564663 A | 1/2005 |
| CN | 1647712 A | 8/2005 |
| CN | 101791879 A | 8/2010 |
| CN | 102065715 A | 5/2011 |
| EP | 1304941 A2 | 5/2003 |
| EP | 1452106 A1 | 9/2004 |
| EP | 2255944 A2 | 12/2010 |
| EP | 2269480 A1 | 1/2011 |
| EP | 2311344 A2 | 4/2011 |
| GB | 2410528 A | 8/2005 |
| GB | 2468869 A | 9/2010 |
| JP | 2003-533314 A | 11/2003 |
| JP | 2005-211198 A | 8/2005 |
| JP | 3886965 B | 2/2007 |
| JP | 2010-162339 A | 7/2010 |
| JP | 2011-143231 A | 7/2011 |
| KR | 10-2010-0084988 A | 7/2010 |
| WO | 01/89338 A2 | 11/2001 |
| WO | 03/030672 A1 | 4/2003 |
| WO | 2009-131044 A1 | 10/2009 |

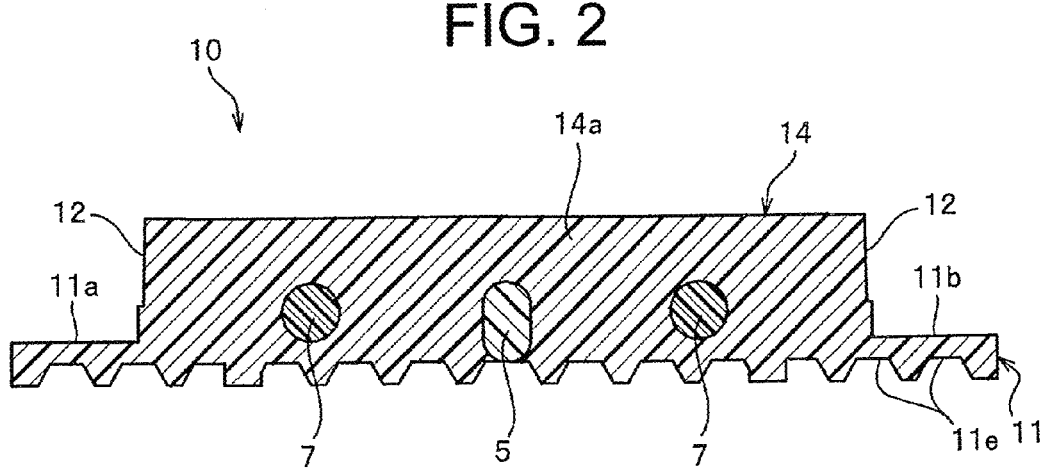
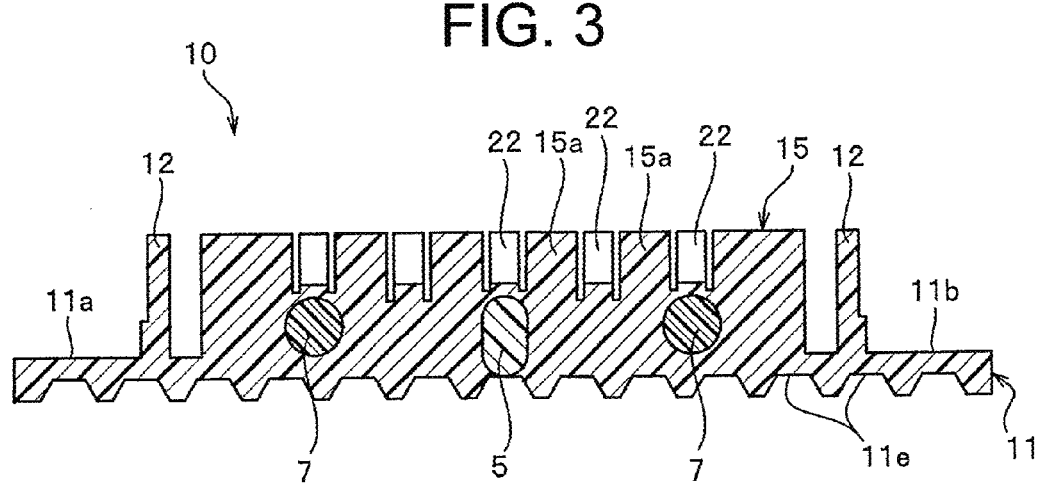
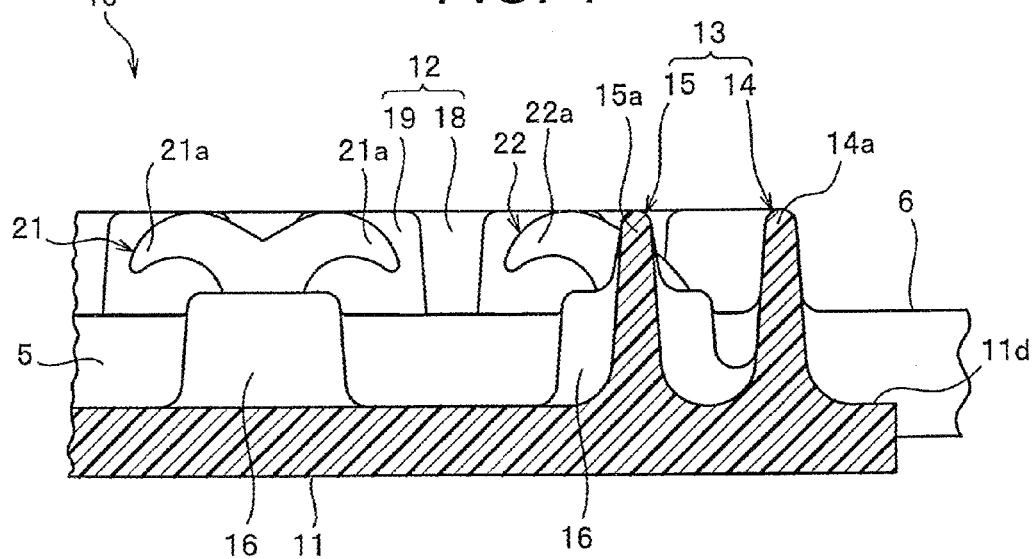

MOLDED SURFACE FASTENER

This application is a divisional application of U.S. application Ser. No. 14/354,231, which is a national stage application of PCT/JP2011/074695, both of which are incorporated herein by reference.

TECHNICAL FIELD

The invention relates to a molded surface fastener which is integrally molded on a foam surface when the foam is molded, and more particularly, to a molded surface fastener in which a plurality of surface fastener members are connected to one another through connecting portions and foam resin material is prevented from entering an engagement element region of the surface fastener member when the foam is foamed and molded.

BACKGROUND ART

In many of seats of cars and trains, various kinds of sofas and office chairs, a surface of a cushion body (foam) which is molded into a predetermined shape using foam resin is covered with covering material made of fiber fabric, or natural or synthetic leather. Some of the cushion bodies used for such various kinds of seats have concavo-convex curved surfaces which can satisfy ergonomic requirements to maintain a seating posture which prevents fatigue even if a user seats on the cushion body for a long time.

When the surface of the cushion body is covered with the covering material, after the cushion body is molded into a predetermined shape, a surface of the obtained cushion body is often covered with covering material and the covering material is fixed. Especially in this case, as means for fixing the surface of the cushion body and a back surface of the covering material to each other, a molded surface fastener is generally utilized.

In the molded surface fastener, a plurality of engagement elements (male engagement elements) are placed on one surface (first surface) of a flat base material made of thermal plasticity resin, and the molded surface fastener is integrally molded such that the engagement elements are exposed on the cushion body surface when the cushion body is molded. A back surface of the covering material which covers the cushion body is provided with a plurality of engagement elements (female engagement elements) which can be engaged with the engagement elements of the molded surface fastener.

When the cushion body on which the molded surface fastener is integrally molded is covered with the covering material, the female engagement elements placed on the back surface of the covering material are pressed against the male engagement elements of the molded surface fastener which is exposed on the cushion body surface, thereby engaging the covering material with the molded surface fastener. As a result, the covering material is easily fixed to the surface of the cushion body along the concavo-convex shape of the surface, and the covering material is prevented from floating up from the cushion body.

Such molded surface fastener which is integrally molded on the cushion body for fixing the covering material is disclosed in, for example, JP 2003-533314 A (Patent Document 1) and JP 2010-162339 A (Patent Document 2).

For example, in a molded surface fastener (fastening tool) 70 described in Patent Document 1, a plurality of surface fastener members (fastening segments) 71 are connected to each other through a flexible hinge 72 as shown in FIG. 16.

In Patent Document 1, each of the surface fastener members 71 includes a base portion 73 provided at its front and back with a fastening surface and a non-fastening surface, a plurality of engagement elements 74 which stand on the fastening surface of the base portion 73, and a gasket 75 which is placed around an outer peripheral edge of the base portion 73 to surround the plurality of engagement elements 74. In this case, each of the engagement elements 74 is configured as a palm-shaped male engagement element having a bifurcated upper end. The gasket 75 is higher than the engagement elements 74 in height as measured from the base portion 73.

Further, in the molded surface fastener 70 of Patent Document 1, the plurality of surface fastener members 71 are connected to each other through the hinge 72. Accordingly, the molded surface fastener 70 can be bent in a front-surface/back-surface direction or a width direction, and can be twisted around a longitudinal axis.

When the molded surface fastener 70 of Patent Document 1 is integrally molded on a cushion body, a tip end of the gasket 75 of the surface fastener member 71 is brought into contact with a cavity surface of a mold, the molded surface fastener 70 is sucked and fixed to a predetermined position of the mold by utilizing a magnetic force and then, foam resin material is injected into a cavity space of the mold. Accordingly, a cushion body with which the molded surface fastener 70 is integrally molded can be obtained.

At that time, the plurality of engagement elements 74 in each of the surface fastener members 71 are surrounded by the gasket 75, and the tip end (upper end) of the gasket 75 is in contact with the cavity surface of the mold. Therefore, the plurality of engagement elements 74 are confined by the gasket 75 and the cavity surface of the mold. Hence, when the foam resin material is injected into the cavity space of the mold, it is possible to prevent the foam resin material from flowing over the gasket 75 of the surface fastener member 71 into an inside region where the engagement elements 74 are placed.

Therefore, even though the molded surface fastener 70 of Patent Document 1 is integrally molded with the cushion body, it is possible to prevent the engagement element 74 of each of the surface fastener members 71 from being buried in and hidden by the foam resin, and the plurality of engagement elements 74 are exposed on the fastening surface in the surface fastener member 71. Therefore, an engaging/connecting force of the engagement elements 74 with respect to the covering material is appropriately secured.

Further, the molded surface fastener 70 of Patent Document 1 can be bent and twisted as described above. Therefore, even if a surface of a cushion body to be molded has a concavo-convex curved surface, the molded surface fastener 70 can integrally be molded with the cushion body in a state where the molded surface fastener 70 curves in the width direction and the front-surface/back-surface direction such that the molded surface fastener 70 matches with a surface shape of the cushion body.

Therefore, when the molded cushion body is covered with the covering material, the covering material is engaged with and connected to the molded surface fastener 70 of the cushion body. According to this, the covering material can be fixed along the concavo-convex shape of the cushion body surface, and it is possible to prevent the covering material from floating up from the cushion body.

As shown in FIG. 17, a molded surface fastener 80 of Patent Document 2 includes a plurality of surface fastener members 81, and flexible connecting portions 82 for connecting the surface fastener members 81 to each other along a longitudinal direction. Each of the surface fastener members 81 includes a flat plate-shaped base material 83, and a plurality of engagement elements (male engagement elements) standing from one surface of the flat plate-shaped base material 83.

In this case, each of the engagement elements 84 includes a standing portion which stands from the flat plate-shaped base material 83, and a pair of engaging heads which is bifurcated from an upper end of the standing portion and which curves into hook shapes. The plurality of engagement elements 84 are arrayed at predetermined distances from one another in the longitudinal direction and the width direction of the surface fastener member 81. According to this, an engagement element region 85 which can be engaged with and connected to the covering material is configured.

A pair of left and right longitudinal protective wall sections 86 is placed along the longitudinal direction on each of both left and right side edges sandwiching the engagement element region 85 in each of the surface fastener members 81 in the width direction. Lateral protective wall sections 87 are formed between the left and right longitudinal protective wall sections 86 along a row of the engagement elements 84 which are arrayed in the width direction. First fixing portions 88 and second fixing portions 89 are provided on the lateral protective wall sections 87 of the surface fastener member 81 such that the first fixing portions 88 and the second fixing portions 89 project from the flat plate-shaped base material 83. The first fixing portions 88 bury and fix a monofilament configuring the connecting portions 82 along the entire region of the surface fastener member 81. The second fixing portions 89 fix linear magnetic materials 90 at positions of the lateral protective wall sections 87.

The longitudinal protective wall sections 86 of Patent Document 2 include three rows of longitudinal wall sections on each of the left and right sides. Each of the longitudinal wall sections includes a plurality of longitudinal wall bodies 86a which are arrayed at a predetermined pitch from one another in the longitudinal direction. In this case, the longitudinal wall bodies 86a are arranged in a zigzag manner between the adjacent longitudinal wall sections such that the longitudinal wall bodies 86a are staggered from one another. The lateral protective wall sections 87 include the engagement elements 84 which are arrayed in the width direction, and a plurality of divided lateral wall bodies 87a which are arranged such that they are divided from one another in the width direction.

When the molded surface fastener 80 of Patent Document 2 having the above-described configuration is to be produced, a continuous long primary surface fastener member before it is divided into the plurality of surface fastener members 81 is first produced. The primary surface fastener member is produced using a producing device that includes a die wheel which rotates, an extrusion nozzle which supplies molten resin to a peripheral surface of the die wheel, and a supply portion which supplies a monofilament and linear magnetic material from an upstream side of a position where the molten resin is supplied to the die wheel. In this case, cavities for forming the engagement elements 84, and cavities for forming the longitudinal wall bodies 86a and lateral wall bodies are formed in the peripheral surface of the die wheel.

After the long primary surface fastener member is produced using such a producing device, a portion of the obtained primary surface fastener member is entirely cut in the width direction at an arbitrary position in the longitudinal direction such that a monofilament configuring a connected portion is left. Accordingly, the molded surface fastener 80 of Patent Document 2 as shown in FIG. 17 is produced.

According to the molded surface fastener 80 of Patent Document 2 produced in this manner, when the cushion body is foamed and molded using a mold, a linear magnetic material 90 of the molded surface fastener 80 is attracted using a magnetic force of a magnet which is previously placed in the mold, and thereby the engagement elements 84 are attracted by and fixed to the cavity surface of the mold such that the engagement elements 84 face the cavity surface. At that time, by bending the connected portion, the molded surface fastener 80 curves in the width direction and the front-surface/back-surface direction. In this state, the molded surface fastener 80 is attracted by and fixed to the cavity surface of the mold, and in this curved posture, the molded surface fastener 80 can integrally be molded with the cushion body.

The engagement element region 85 of the molded surface fastener 80 is surrounded by the longitudinal protective wall sections 86 and the lateral protective wall sections 87. When the cushion body is foamed and molded, upper end surfaces of the longitudinal protective wall sections 86 and the lateral protective wall sections 87 come into close contact with the cavity surface of the mold. Accordingly, foam resin material injected into the cavity space of the mold is prevented from flowing over the longitudinal protective wall sections 86 and the lateral protective wall sections 87 of the surface fastener member 81 and from flowing into the engagement element region 85.

Especially, in Patent Document 2, the longitudinal protective wall sections 86 include the plurality of longitudinal wall bodies 86a which are arranged in the zigzag manner at the predetermined pitch from one another. The longitudinal wall bodies 86a are separated from one another. In this case, even if the foam resin material tries to enter the engagement element region 85 through gaps formed between the longitudinal wall bodies 86a of the longitudinal protective wall sections 86, it is possible to prevent the foam resin material from entering the engagement element region 85 since the foam resin material is foamed and solidified before it reaches the engagement element region 85. Therefore, according to the molded surface fastener 80 of Patent Document 2, even if the cushion body is foamed and molded, the engagement element region 85 of the molded surface fastener 80 can be appropriately exposed on the surface of the cushion body to stably secure the engaging/connecting force of the engagement element region 85.

PRIOR ART DOCUMENT

Patent Documents

Patent Document 1: JP 2003-533314 A
Patent Document 2: JP 2010-162339 A

SUMMARY OF INVENTION

Problem to be Solved by the Invention

Shapes and sizes of seats placed in cars and trains are varied depending upon usage of the seat, a position where the seat is used and a manufacturer who manufactures the seat. Further, materials and physical properties of foam resin materials used for molding the cushion bodies vary a great deal.

The molded surface fastener which is integrally molded with the cushion body is fixed, in some cases, to a cavity surface which curves in a convex or concave form of a mold when the cushion body is foamed and molded because of the shape of the cushion body or the mounting position of the molded surface fastener. In this case, in the molded surface fastener 70 of Patent Document 1 and the molded surface fastener 80 of Patent Document 2, the hinge 72 and the connecting portions 82 which connect the surface fastener members 71 and 81 are flexible as described above. Therefore, it is possible to fix the molded surface fasteners 70 and 80 along the curved cavity surfaces.

However, in the molded surface fastener 70 of Patent Document 1, for example, although the entire molded surface fastener 70 can curve in the width direction and the front-surface/back-surface direction, flexibility of the surface fastener member 71 is deteriorated by the gasket 75 since the gasket 75 stands on the outer peripheral edge of the surface fastener member 71 in a state where the gasket 75 surrounds the engagement element region.

Hence, in a case, for example, where the cavity surface of the mold curves with large curvature, although the entire molded surface fastener 70 of Patent Document 1 is fixed along the cavity surface, a portion in which contact between the surface fastener member 71 and the cavity surface becomes weak is prone to be generated in each of the surface fastener members 71. In some circumstances, the surface fastener member 71 and the cavity surface could be partially separated from each other.

If the cushion body is foamed and molded in the state where the contact between the surface fastener member 71 and the cavity surface is weak or in the state where these two members are separated from each other, due to, for example, a pressure caused when the foam resin material collides against the surface fastener member 71 (especially, gasket 75), there is a problem that it becomes easier for the foam resin material to enter the engagement element region from a portion of the gasket 75 of the surface fastener member 71 where the contact with respect to the cavity surface becomes weak or where the surface fastener member 71 is separated from the cavity surface.

Generally, when a cushion body is foamed and molded, an injection nozzle from which foam resin material is injected is moved relative to the mold, while foam resin material is injected from the injection nozzle into a cavity space of a mold, in some cases. In this case, depending upon motion or an angle of the injection nozzle with respect to the mold, the foam resin material injected from the injection nozzle is obliquely injected to the molded surface fasteners 70, 80, and the foam resin material strongly collides against the gasket 75 or the longitudinal and lateral protective wall sections 86 and 87 of the surface fastener member 71, 81, in some cases.

Hence, in the molded surface fastener 70 of Patent Document 1 and the molded surface fastener 80 of Patent Document 2, even if the gasket 75 or the longitudinal and lateral protective wall sections 86 and 87 of the surface fastener member 71, 81 is/are in close contact with the cavity surface of the mold, there is a possibility that the foam resin material which strongly collides against the gasket 75 or the longitudinal and lateral protective wall sections 86, 87 flows into forming regions of the engagement elements 74, 84 through between the cavity surface and the gasket 75 or the longitudinal and lateral protective wall sections 86, 87.

Further, in the case of the molded surface fastener 80 of Patent Document 2, although foam resin material which tries to enter the forming region of the engagement element 84 from the longitudinal direction of the surface fastener member 81 is prevented by the lateral protective wall sections 87, the lateral protective wall sections 87 of Patent Document 2 include the plurality of engagement elements 84 and the plurality of divided lateral wall bodies 87a as described above.

In this case, small gaps are formed between the engagement elements 84 and the divided lateral wall bodies 87a, and the engaging head of each of the engagement elements 84 is bifurcated back and forth. Hence, even if the lateral protective wall sections 87 are made to come into close contact with the cavity surface of the mold, in a case of, for example, low viscosity of the foam resin material, the foam resin material passes through the gaps between the engagement elements 84 and the divided lateral wall bodies 87a and gaps formed between the bifurcated engaging heads in the engagement elements 84, and therefore, the foam resin material flows over the lateral protective wall sections 87 and enters the engagement element region 85, in some cases.

Generally, when the molded surface fastener is integrally molded on the cushion body, in order to stably fix covering material to the cushion body and to effectively prevent the covering material from floating up from the cushion body, it is required to stably secure engaging/connecting forces possessed by the surface fastener members by securing an area of the engagement element region in each of the surface fastener members of the molded surface fastener as wide as possible, and by appropriately placing the engagement element to an end of the engagement element region.

However, the molded surface fastener 80 of Patent Document 2, for example, is produced in such a manner that after the long primary surface fastener member is produced using the die wheel, a portion of the primary surface fastener member is cut at an arbitrary position in the longitudinal direction, as described above. Hence, when the surface fastener member 81 of Patent Document 2 is produced by cutting a portion of the primary surface fastener member where a lateral protective wall section is placed, for example, in this surface fastener member 81, a next lateral protective wall section which is placed in adjacent to an inner side of the cut lateral protective wall section serves as a wall which actually prevents entry of foam resin material.

As a result, an area of the engagement element region in this surface fastener member 81 is reduced by such an amount that a position of the wall, which actually prevents the foam resin material from entering, is deviated inward of the surface fastener member 81. Therefore, there is a problem that the engaging/connecting force of the surface fastener member 81 is largely lowered.

The invention has been accomplished in view of the above-described conventional problems and it is a specific object of the invention to provide a molded surface fastener capable of stably obtaining an engaging/connecting force of each of surface fastener members by effectively preventing foam resin material from entering a forming region of an engagement element, especially, from a longitudinal direction of each of the surface fastener members, when a cushion body is foamed and molded, and capable of enhancing the engaging/connecting force of each of the surface fastener members by enlarging an engagement element region up to a location in the vicinity of an end edge in the longitudinal direction in each of the surface fastener members.

Means for Solving the Problem

To achieve the above object, the invention provides, as a basic configuration, a molded surface fastener comprising surface fastener members in which a plurality of engagement elements stand on first surfaces of flat plate-shaped base materials, and flexible connecting portions which connect the plurality of surface fastener members to each other in a longitudinal direction, in which each of the surface fastener members includes a pair of left and right longitudinal protective wall sections placed along the longitudinal direction on left and right side edge portions of the flat plate-shaped base materials in a width direction, and a pair of front and rear lateral protective wall sections placed on front and rear end edge portions of the flat plate-shaped base materials in the longitudinal direction, and the molded surface fastener is integrally molded on a surface of a cushion body when the cushion body is foamed and molded, being most primarily characterized in that each of the lateral protective wall sections includes an outer first lateral wall section and an inner second lateral wall section, the engagement elements include first engagement elements placed in a region surrounded by the longitudinal protective wall section and the second lateral wall section, and a distance between the first lateral wall section and the second lateral wall section is set smaller than a mounting pitch of the first engagement elements in the longitudinal direction of the surface fastener member.

In the molded surface fastener of the invention, it is preferable that the engagement elements include a second engagement elements directly placed in the second lateral wall section, the second lateral wall section comprises divided lateral wall bodies which are intermittently placed along the width direction between the left and right longitudinal protective wall sections and the second engagement elements placed between the divided lateral wall bodies, and upper ends of the divided lateral wall bodies and the second engagement elements are separated from each other.

In the molded surface fastener of the invention, it is preferable that the second engagement element includes a standing portion which stands from the first surface of the flat plate-shaped base material, and a cantilever engaging head which curves in a hook shape from an upper end portion of the standing portion toward a forming region of the first engagement elements.

In the molded surface fastener of the invention, it is preferable that the divided lateral wall body and the second engagement element are connected to each other at their lower end portions on a side closer to the flat plate-shaped base material, and are separated from each other at their upper end portions.

In the molded surface fastener of the invention, it is preferable that the first lateral wall section comprises a continuous lateral wall body which is connected to the left and right longitudinal protective wall sections and which continuously stands at a predetermined height from the flat plate-shaped base materials between the left and right longitudinal protective wall sections.

In the molded surface fastener of the invention, it is preferable that the first lateral wall section comprises only the continuous lateral wall body.

In the molded surface fastener of the invention, it is preferable that the surface fastener member includes at least one slit formed in the flat plate-shaped base material along the width direction of the surface fastener member, and the slit is placed between the first engagement elements which are placed at a predetermined mounting pitch in the longitudinal direction of the surface fastener member.

In the molded surface fastener of the invention, it is preferable that the surface fastener member includes a member having magnetic property.

Effects of the Invention

According to the molded surface fastener of the invention, each of the surface fastener members includes the flat plate-shaped base material, the plurality of engagement elements standing on the flat plate-shaped base material, the left and right longitudinal protective wall sections placed on the left and right side edges of the flat plate-shaped base material along the longitudinal direction, and the front and rear lateral protective wall section placed on the front and rear end edges of the flat plate-shaped base material along the front and rear end edges of the flat plate-shaped base material. The front and rear lateral protective wall sections include first lateral wall sections placed on an outer side and second lateral wall sections placed on an inner side. Further, the engagement elements include the first engagement elements standing on the region surrounded by the longitudinal protective wall section and the second lateral wall section, and the second engagement elements directly placed in the lateral protective wall section.

In this case, the first lateral wall section includes the continuous lateral wall body which continuously stands from the flat plate-shaped base material along the width direction at the predetermined height, and the continuous lateral wall body is connected to the left and right longitudinal protective wall sections. The second lateral wall section includes the plurality of divided lateral wall bodies which intermittently stand from the flat plate-shaped base material along the width direction between the left and right longitudinal protective wall sections, and the plurality of second engagement elements placed between the divided lateral wall bodies.

According to the molded surface fastener of the invention having the above-described configuration, the continuous lateral wall body of the first lateral wall section which is continuously placed between the left and right longitudinal protective wall sections can effectively deter foam resin material which tries to enter the engagement element region of the first and second engagement elements from the longitudinal direction of the surface fastener member when a cushion body is foamed and molded.

Further, the continuous lateral wall body of the first lateral wall section functions as a first obstacle wall and prevents entry of foam resin material. Therefore, it is basically difficult for the foam resin material to flow over the first lateral wall section and to enter inside. Even if the foam resin material flows over the first lateral wall section and enters inside due to a reason, for example, that a cavity surface of a mold to which the molded surface fastener is fixed is curved with large curvature, the second lateral wall section placed inward of the first lateral wall section can prevent the foam resin material from entering the forming region of the first engagement elements on which a plurality of first engagement elements stand.

Especially in this case, inflow pressure of foam resin material which flows over the first lateral wall section is not high. Therefore, even if the second lateral wall section is composed of the plurality of divided lateral wall bodies and the plurality of second engagement elements as described above, the second lateral wall section can effectively prevent the foam resin material from entering.

According to the molded surface fastener of the invention, since the second engagement elements are placed on the second lateral wall section which configures the lateral protective wall section, the second lateral wall section itself has an engaging/connecting force caused by the second engagement elements. Therefore, in each of the surface fastener members, the engagement element regions of the first and second engagement elements are widely formed from a position of the second lateral wall section placed on a front side to a position of the second lateral wall section placed on a rear side in the longitudinal direction. Therefore, it is possible to stably obtain an engaging/connecting force even on the front and rear end edges of each of the surface fastener members. It is also possible to increase the number of first engagement elements formed in each surface fastener member to enhance the engaging/connecting force of the surface fastener member.

Further, in the invention, the second lateral wall section is divided into the plurality of divided lateral wall bodies and the plurality of second engagement elements. Therefore, when the molded surface fastener is to be produced using a die wheel having a cavity space in its peripheral surface, it is possible to stably form the second engagement element of the second lateral wall section into a predetermined shape by the die wheel.

More specifically, for example, when a lateral wall section having a continuous lateral wall body and an engagement element which is integrally formed on the continuous lateral wall body is to be formed using the die wheel, the engagement element which is integrally formed on the continuous lateral wall body in the lateral wall section cannot smoothly be pulled out from the cavity space of the die wheel when a primary molding of the molded surface fastener is peeled off from the die wheel, and a trouble that a portion of the engagement element is cut occurs in some cases.

In contrast, according to the molded surface fastener of the invention, since the second lateral wall section is divided into the plurality of divided lateral wall bodies and the plurality of second engagement elements as described above, the second engagement elements can move in the longitudinal direction freely to some extent. Hence, when the molding of the molded surface fastener is peeled off from the die wheel, the second engagement element having a predetermined shape can smoothly be pulled out from the cavity space of the die wheel, and it is possible to effectively avoid a trouble that the second engagement element is cut.

In the molded surface fastener of the invention, a distance between the first lateral wall section and the second lateral wall section is set smaller than a mounting pitch of the first engagement elements in the longitudinal direction of the surface fastener member. Accordingly, the engagement element region of the first and second engagement elements in the surface fastener member can be formed more widely. Therefore, it is possible to enhance an engaging/connecting force of each of the surface fastener members by, for example, increasing the number of first engagement elements to be installed. Further, since the second engagement elements can be provided in the vicinity of the front and rear end edges of each of the surface fastener members, it is possible to stably secure engaging/connecting forces of the front and rear end edges of the surface fastener member.

In the molded surface fastener of the invention, the second engagement element includes a standing portion which stands from the first surface of the flat plate-shaped base material, and a cantilever engaging head which curves in a hook shape from an upper end of the standing portion toward a forming region of the first engagement element.

Accordingly, the second engagement element can stably have an appropriate engaging/connecting force at the lateral protective wall section, and when the second lateral wall section is formed using a die wheel, for example, it is possible to easily pull out the second engagement element from a cavity space of the die wheel. Even when foam resin material which flows over the first lateral wall section and enters inside is hold back by the second lateral wall section, since the engaging head of the second engagement element is oriented toward the forming region of the first engagement element, the second engagement element can exert the stable engaging/connecting force.

In the second lateral wall section of the invention, lower ends of the divided lateral wall body and the second engagement element on a side closer to the flat plate-shaped base material are connected to each other, and upper ends of the divided lateral wall body and the second engagement element are separated from each other. Accordingly, the second lateral wall section can be configured strong, and it is possible to easily pull out the second engagement element from the cavity space of the die wheel when the second lateral wall section is molded using the die wheel.

Further, in the molded surface fastener of the invention, the first lateral wall section includes only the continuous lateral wall body. Accordingly, it is possible to stably prevent foam resin material from entering inside by the first lateral wall section, and it is possible to easily mold the first lateral wall section using the die wheel.

In the molded surface fastener of the invention, the surface fastener member includes at least one slit formed in the flat plate-shaped base material along a width direction of the surface fastener member, and the slit is placed between the first engagement elements which are placed at a predetermined mounting pitch in the longitudinal direction of the surface fastener member.

Since such a slit is provided, it is possible to largely enhance the flexibility in the longitudinal direction of each of the surface fastener members. Hence, even if a cavity surface of the mold to which the molded surface fastener is fixed is curved with large curvature, it is possible to easily curve each of the surface fastener members along the cavity surface, and to enhance adhesion between the surface fastener member and the cavity surface.

Therefore, it is possible to prevent the surface fastener member and the cavity surface from partially separating from each other, and to prevent a contact-weak portion between the surface fastener member and the cavity surface from generating. Therefore, it is possible to reduce the risk that foam resin material flows over the first lateral wall section and enters inside, and it is possible to stably secure the engaging/connecting force of each of the surface fastener members. Further, when the molded surface fastener is integrally molded on a cushion body, it is possible to prevent cushioning properties of the cushion body from being deteriorated by the molded surface fastener.

In the molded surface fastener of the invention, by fixing linear magnetic material, or by mixing or kneading magnetic particles into synthetic resin which configures the surface fastener member, the surface fastener member includes a member having magnetic property. Accordingly, the surface fastener member can be provided with magnetic property. Hence, when a cushion body is foamed and molded using a mold in which a magnet is placed in the cavity surface or in the vicinity of the cavity surface, it is possible to easily and stably attract and fix the molded surface fastener to the cavity surface of the mold by utilizing a magnetic force generated between the magnet of the mold and the surface fastener member.

BRIEF DESCRIPTION OF DRAWINGS

FIG. 2 is a sectional view taken along line II-II in FIG. 1 as viewed from arrows.

FIG. 3 is a sectional view taken along line in FIG. 1 as viewed from arrows.

FIG. 4 is a sectional view taken along line IV-IV in FIG. 1 as viewed from arrows.

MODES FOR CARRYING OUT THE INVENTION

Preferred embodiments of the invention will be described in detail with reference to the drawings. The invention is not limited to the embodiments which will be described below, and the invention can variously be modified as far as substantially the same configuration as that of the invention can be provided and the same working effects can be exerted.

First Embodiment

Figure 1:
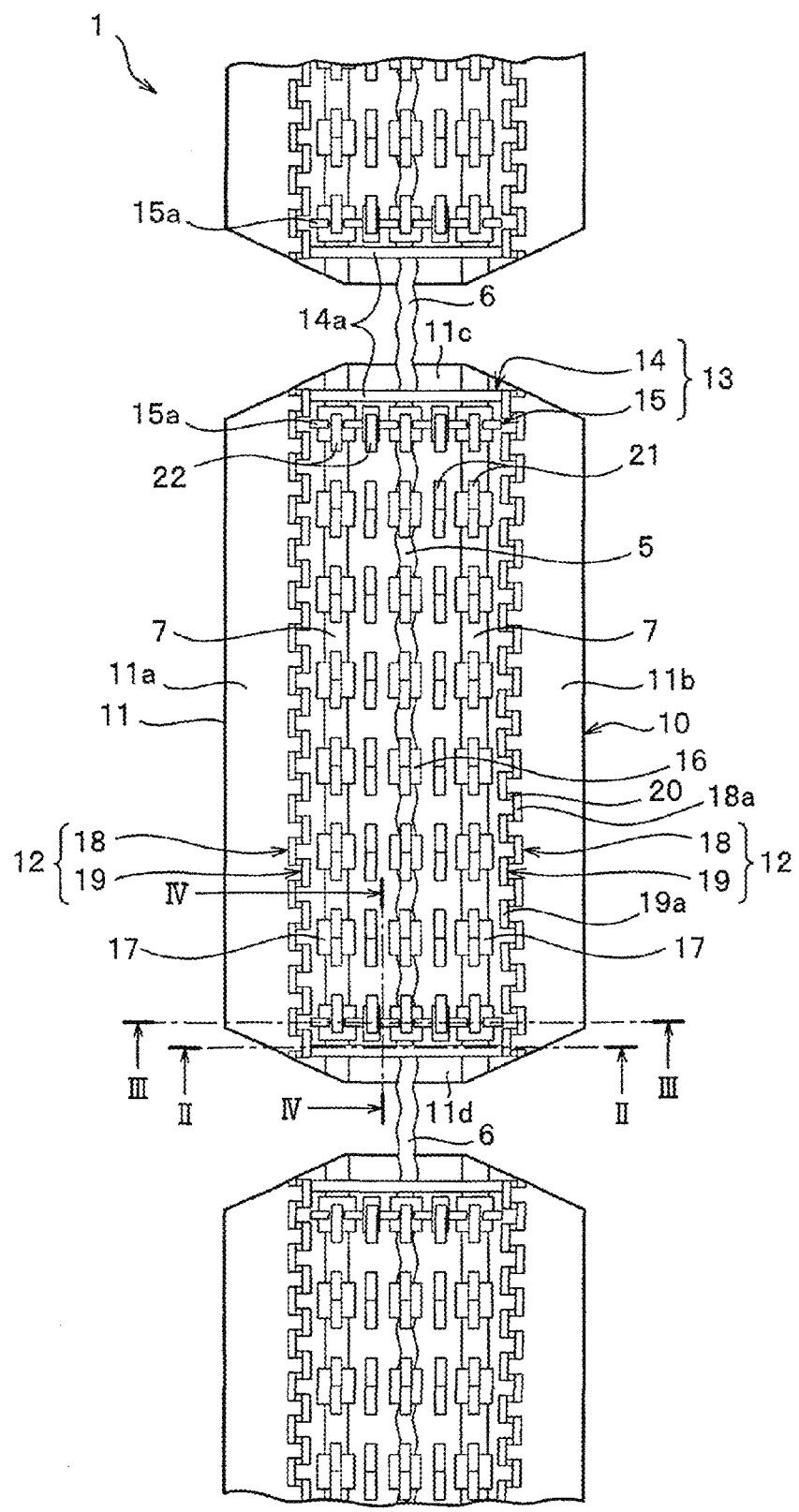
FIG. 1 is a plan view illustrating a molded surface fastener according to a first embodiment of the invention.

FIG. 1 is a plan view illustrating a molded surface fastener according to the first embodiment, and FIGS. 2, 3 and 4 are sectional views respectively taken along line II-II, line III-III and line IV-IV in FIG. 1 as viewed from arrows.

In the following description, a forward/backward direction in a flat plate-shaped base material of a molded surface fastener is defined as a longitudinal direction, and a width direction in the flat plate-shaped base material is defined as a lateral direction. A front-surface/back-surface direction in the flat plate-shaped base material is defined as a vertical direction. Especially, a direction where a first engagement element is placed with respect to the flat plate-shaped base material is defined as an upward direction, and a direction opposite from the former direction is defined as a downward direction.

The molded surface fastener 1 of the first embodiment includes a plurality of surface fastener members 10 which are divided from one another, monofilaments 5 configuring connecting portions 6 which connect the surface fastener members 10 to each other along the longitudinal direction, and linear magnetic materials 7 fixed to each of the molded surface fasteners 1 along the longitudinal direction. The surface fastener members 10 are connected to each other through the connecting portions 6 at a predetermined distance from each other. In this case, the number of surface fastener members 10 is not specifically limited, and the number can be changed freely in accordance with a size and a shape of a cushion body on which the molded surface fastener 1 is integrally molded.

The surface fastener members 10 in the molded surface fastener 1 are molded by molding thermal plasticity resin material using a die wheel 31 as will be described later. As material of the surface fastener member 10, it is possible to employ thermal plasticity resin material such as polyethylene, polypropylene, polyester, nylon, polybutylene terephthalate, and copolymer thereof.

Each of the surface fastener members 10 has a substantially octagonal shape which is long in the longitudinal direction (length direction) as viewed from an upper surface. Left and right end edges of the surface fastener member 10 are parallel to each other along the longitudinal direction of the surface fastener member 10.

Each of the surface fastener members 10 includes a flat plate-shaped base material 11, left and right longitudinal protective wall sections 12 standing on an upper surface of the flat plate-shaped base material 11, front and rear lateral protective wall sections 13 placed along the width direction between the left and right longitudinal protective wall sections 12, a plurality of first engagement elements (male engagement elements) 21 standing in a region located inward of the longitudinal protective wall sections 12 and the lateral protective wall sections 13, a plurality of second engagement elements (male engagement elements) 22 placed in lateral protective wall sections 13, first fixing portions 16 for fixing the monofilaments 5 on the side of the upper surface of the flat plate-shaped base material 11, and second fixing portions 17 for fixing the linear magnetic materials 7 on the side of the upper surface of the flat plate-shaped base material 11.

In the first embodiment, the engagement element region is a region where the first and second engagement elements 21 and 22 exerting engaging/connecting forces are placed. Especially in the case of the first embodiment, the engagement element region is a region surrounded by later-described inner second longitudinal wall sections 19 of the left and right longitudinal protective wall sections 12, and by later-described inner second lateral wall sections 15 of the front and rear lateral protective wall sections 13. In this case, the engagement element region of the first embodiment is a region located inward of a position of a later-described divided lateral wall body 15a of the second lateral wall section 15 in the longitudinal direction.

A thickness of the flat plate-shaped base material 11 in the first embodiment is thin so that the flat plate-shaped base material 11 can curve in the vertical direction (front-surface/back-surface direction). The flat plate-shaped base material 11 includes left and right laterally extending portions 11a and 11b which outwardly extend in the width direction from the left and right longitudinal protective wall sections 12, a forwardly extending portion 11c extending more forward from the front lateral protective wall section 13, and a rearwardly extending portion 11d extending more rearward from the rear lateral protective wall section 13.

A plurality of concave grooves 11e placed along the longitudinal direction are formed in a lower surface of the flat plate-shaped base material 11. Since the plurality of concave grooves 11e are placed in the lower surface of the flat plate-shaped base material 11, it is possible to increase a bonding area between the surface fastener members 10 and the cushion body and to enhance fixing strength therebetween when the molded surface fastener 1 is integrally molded on the later-described cushion body (foam). In this invention, to enhance the fixing strength between the surface fastener member 10 and the cushion body, convex portions or arrow-head-shaped projections may be provided on the lower surface of the flat plate-shaped base material 11 instead of the concave grooves 11e, or a non-woven cloth may be adhered to or fixed to the lower surface of the flat plate-shaped base material 11.

The left and right longitudinal protective wall sections 12 stand along the longitudinal direction at locations closer to left and right side edges of the flat plate-shaped base material 11 such that the left and right longitudinal protective wall sections 12 sandwich the engagement element regions of the first and second engagement elements 21 and 22. In this case, the left and right longitudinal protective wall sections 12 are placed at positions entering inward in the width direction from the left and right end edges of the flat plate-shaped base material 11.

Each of the left and right longitudinal protective wall sections 12 includes first longitudinal wall sections (first longitudinal wall rows) 18 respectively placed on the outer side of the width direction, and second longitudinal wall sections (second longitudinal wall rows) 19 placed inward of the first longitudinal wall sections 18 (closer to the engagement element region). The first and second longitudinal wall sections 18 and 19 include a plurality of longitudinal wall bodies 18a and 19a. In the invention, the number (number of rows) of the first and second longitudinal wall sections 18 and 19 configuring the longitudinal protective wall sections 12, and styles of the longitudinal wall bodies 18a and 19a are not specifically limited.

In the first embodiment, the longitudinal wall bodies 18a and 19a of the first and second longitudinal wall sections 18 and 19 are intermittently placed at a predetermined mounting pitch from one another along the longitudinal direction, and predetermined gaps are provided between the longitudinal wall bodies 18a. The longitudinal wall bodies 18a of the first longitudinal wall section 18 and the longitudinal wall bodies 19a of the second longitudinal wall section 19 are deviated from one another in a staggered manner.

Further, front ends of the longitudinal wall bodies 18a of the first longitudinal wall section 18 and rear ends of the longitudinal wall bodies 19a of the second longitudinal wall section 19 are connected to each other through wall connecting portions 20, and rear ends of the longitudinal wall bodies 18a of the first longitudinal wall section 18 and front ends of the longitudinal wall bodies 19a of the second longitudinal wall section 19 are connected to each other through the wall connecting portions 20. In this case, The longitudinal wall bodies 18a of the first longitudinal wall section 18, the longitudinal wall bodies 19a of the second longitudinal wall section 19 and the wall connecting portions 20 are formed such that heights thereof from the upper surface of the flat plate-shaped base material 11 are the same.

Since the left and right longitudinal protective wall sections 12 are configured as described above, when the cushion body is foamed and molded, it is possible to prevent the foam resin material from flowing over the longitudinal protective wall sections 12 and from entering the forming regions (engagement element regions) of the first and second engagement elements 21 and 22. Although the left and right longitudinal protective wall sections 12 stand along the longitudinal direction of the surface fastener members 10, it is possible to bend the surface fastener members 10 in the vertical direction by enlarging or narrowing the gaps provided between the longitudinal wall bodies 18a and 19a of the first and second longitudinal wall sections 18 and 19, and it is possible to restrain flexibility of the surface fastener members 10 from being deteriorated by providing the left and right longitudinal protective wall sections 12.

To secure an appropriate engaging/connecting force with respect to covering material which is put on the cushion body, the first engagement elements 21 stand on the upper surface of the flat plate-shaped base material 11 such that the first engagement elements 21 are arrayed in regions surrounded by the longitudinal protective wall sections 12 and the lateral protective wall sections 13 at predetermined mounting pitch from each other in the longitudinal direction and the width direction. Especially in the case of the first embodiment, the first engagement elements 21 are arrayed in the engagement element region of the surface fastener member 10 in five longitudinal rows along the longitudinal direction between the left and right longitudinal protective wall sections 12, and in six lateral rows along the width direction between front and rear lateral protective wall sections 13.

In this case, as shown in FIG. 4, each of the first engagement elements 21 includes a standing portion (not shown) which vertically stands from the upper surface of the flat plate-shaped base material 11, and a hook-shaped engaging head 21a which branches off and curves from an upper end of the standing portion in the longitudinal direction. Heights of the first engagement elements 21 from the upper surface of the flat plate-shaped base material 11 are the same as heights of the longitudinal wall bodies 18a and 19a of the first and second longitudinal wall sections 18 and 19 which configure the longitudinal protective wall sections 12. In the invention, a shape, a size and a mounting pitch of the engagement element are not specifically limited, and they can freely be changed.

The front and rear lateral protective wall sections 13 in the first embodiment stand at front and rear end edges of the flat plate-shaped base material 11 along the width direction of the surface fastener members 10 between the left and right longitudinal protective wall sections 12. The lateral protective wall sections 13 include first lateral wall sections 14 placed on front and rear end edges of the flat plate-shaped base material 11, and second lateral wall sections 15 placed on an inner side of the first lateral wall sections 14 (on the side of forming region of the first engagement element 21) such that the second lateral wall sections 15 are separated from the first lateral wall sections 14.

In the front and rear lateral protective wall sections 13, the first lateral wall sections 14 and the second lateral wall sections 15 are arrayed in parallel to each other, and a distance between the first and second lateral wall sections 14 and 15 is set smaller than a mounting pitch of the first engagement element 21 in the longitudinal direction. Accordingly, it is possible to shorten a distance between an engagement element region of one of the surface fastener members 10 and an engagement element region of another surface fastener member 10 which is adjacent to the one surface fastener member 10. That is, in the molded surface fastener 1, since more first engagement elements 21 can be provided along the longitudinal direction, it is possible to enhance the engaging/connecting force of the entire molded surface fastener 1.

In the invention, the distance between the first and second lateral wall sections 14 and 15 can freely be set. Similar to a molded surface fastener 3 of a later-described third embodiment, a distance between the first lateral wall section and the second lateral wall section may be set to the same value as the mounting pitch of the first engagement elements in the longitudinal direction, or may be set to a greater value than the mounting pitch of the first engagement element in the longitudinal direction.

As shown in FIG. 2, the first lateral wall section 14 includes a continuous lateral wall body 14a which continuously stands between the left and right longitudinal protective wall sections 12 at a given height from the flat plate-shaped base material 11. The continuous lateral wall body 14a is straightly placed along the width direction of the surface fastener member 10, and is connected to the longitudinal wall bodies 19a of the second longitudinal wall section 19 of the longitudinal protective wall section 12.

In this case, the height of the continuous lateral wall body 14a from the upper surface of the flat plate-shaped base material 11 is set to the same heights of the first engagement elements 21 and the longitudinal wall bodies 18a and 19a of the first and second longitudinal wall sections 18 and 19 which configure the longitudinal protective wall section 12. The monofilament 5 and the linear magnetic material 7 are buried in the continuous lateral wall body 14a and are fixed therein. In the invention, the continuous lateral wall body 14a may not be placed straightly along the width direction of the surface fastener member 10. For example, the continuous lateral wall body 14a may be placed such that it is bent in an outward convex form along shapes of front and rear end edges of the surface fastener member 10.

As shown in FIG. 3, the second lateral wall section 15 includes a plurality of divided lateral wall bodies 15a which intermittently stand between the left and right longitudinal protective wall sections 12 along the width direction of the surface fastener member 10 at a given height from the flat plate-shaped base material 11, and a plurality of second engagement elements 22 which are placed between the divided lateral wall bodies 15a and which configure the second lateral wall section 15 together with the divided lateral wall bodies 15a.

Especially, each of the second lateral wall sections 15 of the first embodiment includes the six divided lateral wall bodies 15a straightly arranged along the width direction, and the five second engagement elements 22 standing between these divided lateral wall bodies 15a. In this case, each of the divided lateral wall bodies 15a stands in a rectangular parallelepiped form on the side of the upper surface of the flat plate-shaped base material 11.

Each of the second engagement elements 22 includes a standing portion (not shown) standing from the upper surface of the flat plate-shaped base material 11, and a cantilever engaging head 22a which curves from an upper end of the standing portion in a hook form toward the forming region of the first engagement element 21 (inward of the flat plate-shaped base material 11 in the longitudinal direction). Each of second and fourth second engagement elements 22 from the left longitudinal protective wall section 12 is provided with a rib around the standing portion for reinforcing the second engagement element 22.

As shown in FIG. 3, in the second lateral wall section 15, lower ends of the divided lateral wall body 15a and the second engagement element 22 which are adjacent to each other are connected to each other. Accordingly, both the divided lateral wall body 15a and the second engagement element 22 are reinforced, and strength of the divided lateral wall body 15a and the second engagement element 22 is enhanced.

The divided lateral wall body 15a and the second engagement element 22, which are adjacent to each other, are separated from each other such that a small distance is left between their upper ends. Accordingly, flexibility is given to movement of the engaging head 22a of the second engagement element 22. Therefore, when the second lateral wall section 15 is formed using the die wheel 31 as will be described later, the second engagement element 22 can easily be pulled out from the cavity surface of the die wheel 31, and it is possible to stably mold the second engagement element 22 having a predetermined shape. Although the second lateral wall section 15 is separated from the left and right longitudinal protective wall sections 12, the second lateral wall section 15 may be connected to the longitudinal wall bodies 19a of the second longitudinal wall section 19 depending upon a position where the second lateral wall section 15 is placed.

In the second lateral wall section 15, a height of the divided lateral wall body 15a and a height of the second engagement element 22 from the upper surface of the flat plate-shaped base material 11 are set equal to each other, and these heights are also set equal to heights of the first engagement element 21, the continuous lateral wall body 14a and the longitudinal wall bodies 18a and 19a of the first and second longitudinal wall sections 18 and 19 which configure the longitudinal protective wall section 12.

That is, in the first embodiment, as shown in FIGS. 2 and 3, in a state where the surface fastener member 10 is not curved, upper end positions of the first and second longitudinal wall sections 18 and 19 which configure the longitudinal protective wall section 12, the first and second lateral wall sections 14 and 15 which configure the lateral protective wall section 13, and the first engagement element 21 are located on the same plane.

Hence, when the cushion body is foamed and molded as will be described later, it is possible to stably bring the molded surface fastener 1 into close contact with the flat cavity surface of the mold. Accordingly, it is possible to prevent foam resin material from flowing over the longitudinal protective wall sections 12 and the lateral protective wall sections 13 and from entering the engagement element region, especially the forming region of the first engagement element 21.

In the first embodiment, each of the first fixing portions 16 which fixes the monofilament 5 projects in a block form from the upper surface of the flat plate-shaped base material 11, the first fixing portion 16 is integrally molded with the first and second engagement elements 21 and 22 at a position of a substantially central portion of the surface fastener member 10 in its width direction, and the first fixing portions 16 are placed at a predetermined distance from one another in the longitudinal direction of the surface fastener member 10. The first fixing portion 16 is buried to penetrate the monofilament 5, thereby fixing the monofilament 5.

Each of the second fixing portions 17 which fixes the linear magnetic material 7 projects in a block form from the upper surface of the flat plate-shaped base material 11, the second fixing portion 17 is integrally molded on the first and second engagement elements 21 and 22 which are longitudinal rows arrayed closest to the left and right longitudinal protective wall sections 12, and the second fixing portions 17 are placed at a predetermined distance from one another in the longitudinal direction of the surface fastener member 10. The second fixing portion 17 is buried to penetrate the linear magnetic material 7, thereby fixing the linear magnetic material 7.

In the invention, the first fixing portion 16 which fixes the monofilament 5 and the second fixing portion 17 which fixes the linear magnetic material 7 may be independent from the first and second engagement elements 21 and 22. For example, the second fixing portion 17 may be placed on a lower surface of the flat plate-shaped base material 11, and the linear magnetic material 7 may be fixed to the lower surface of the flat plate-shaped base material 11. It is possible to provide the surface fastener member 10 itself with magnetic property by mixing or kneading magnetic particles in synthetic resin which configures the surface fastener member 10 instead of fixing the linear magnetic material 7 to the flat plate-shaped base material 11.

In the first embodiment, the connecting portion 6 which connects the surface fastener members 10 to each other includes the synthetic resin linear monofilament 5 fixed by the first fixing portion 16 and the first lateral wall section 14 of each of the surface fastener members 10 as described above. The monofilament 5 is narrower in width than the surface fastener member 10, is made of thermal plasticity resin such as polyester, and is flexible.

Since the surface fastener members 10 are connected to each other through such a connecting portion 6, it is possible to easily bend the molded surface fastener 1 in the width direction and the front-surface/back-surface direction. Especially in the first embodiment, the monofilament 5 has an elliptical transverse cross section extending long in the vertical direction, and is bent into a zigzag form in the lateral direction. Accordingly, the molded surface fastener 1 can more easily be bent in the width direction at the connecting portion 6.

The linear magnetic material 7 is fixed to the upper surface of the flat plate-shaped base material 11 by the second fixing portion 17 and the first lateral wall section 14 along longitudinal rows (rows in longitudinal direction) of the first and second engagement elements 21 and 22 placed closest to the left and right longitudinal protective wall sections 12 in the region of each of the surface fastener members 10. The linear magnetic material 7 has a circular cross section, and is made of material which is attracted or attracts magnetically.

Since such a linear magnetic material 7 is placed on the surface fastener member 10, when cushion body is foamed and molded using a mold in which a magnet is placed on the cavity surface or in the vicinity of the cavity surface, it is possible to stably attract and fix the molded surface fastener 1 to the cavity surface of the mold by utilizing a magnetic force generated between the magnet of the mold and the linear magnetic material 7 of the surface fastener member 10.

In this case, as the linear magnetic material 7 which is magnetically attracted, it is possible to use a monofilament in which magnetic particles made of alloy of iron, cobalt, nickel and the like are mixed into synthetic resin such as polyester, or to use a metal twine formed by twining several metal thin wires made of the alloy. As materials of the linear magnetic material 7 which magnetically attracts, it is possible to use magnetized wire material, more specifically, a metal linear magnet, a linear rubber magnet which is magnetized by including magnetic iron oxide in rubber, and the like. In the invention, it is also possible to use thin tape-shaped magnetic material instead of the linear magnetic material.

Figure 5:
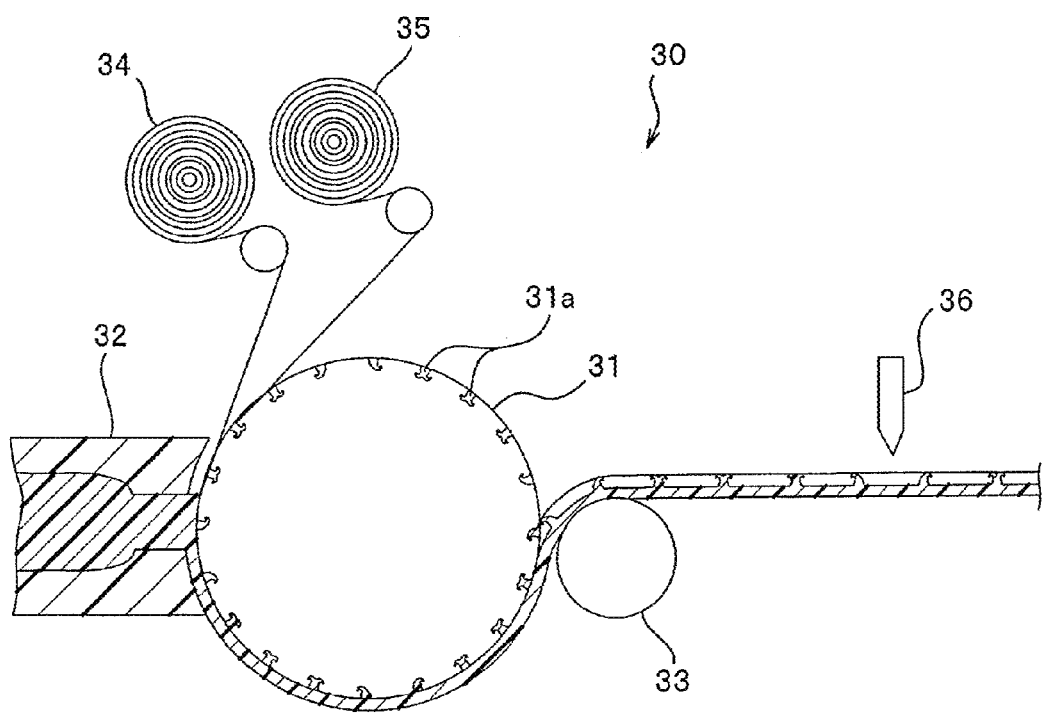
FIG. 5 is a schematic diagram for explaining steps of producing the molded surface fastener.

Next, a method of producing the molded surface fastener 1 of the first embodiment having the above-described configuration will be described. The molded surface fastener 1 of the first embodiment is produced using a producing device 30 as shown in FIG. 5.

More specifically, the producing device 30 of the molded surface fastener 1 includes the die wheel 31 which rotates in one direction, a continuous extrusion nozzle 32 for extruding molten resin placed such that it faces a peripheral surface of the die wheel 31, a pickup roller 33 placed downstream of the continuous extrusion nozzle 32 in a rotation direction of the die wheel 31 such that the pickup roller 33 faces the peripheral surface of the die wheel 31, a monofilament supply portion 34 which is placed upstream of the continuous extrusion nozzle 32 in the rotation direction of the die wheel 31 and which introduces the monofilament 5 into between facing surfaces of the die wheel 31 and the continuous extrusion nozzle 32, a linear magnetic material supply portion 35 which introduces the linear magnetic material 7 into between facing surfaces of the die wheel 31 and the continuous extrusion nozzle 32, and a cutting portion 36 for cutting a predetermined portion of a continuous long surface fastener member (primary surface fastener member, hereinafter) which is peeled off from the peripheral surface of the die wheel 31.

Molding cavities 31a for molding the first engagement elements 21, the longitudinal protective wall sections 12 and the lateral protective wall sections 13 of the molded surface fastener 1 are formed in the peripheral surface of the die wheel 31 possessed by the producing device 30. The die wheel 31 makes cooling liquid flow inside the die wheel 31, and a cooling liquid tank (not shown) is placed in a lower portion of the die wheel 31 so that a lower half of the die wheel 31 can be immersed in the tank.

When the molded surface fastener 1 of the first embodiment is produced using such a producing device 30, first, molten resin material is continuously extruded from the continuous extrusion nozzle 32 toward the peripheral surface of the die wheel 31. At that time, the die wheel 31 rotates in one direction, a flat plate-shaped base material 11 and the like of the molded surface fastener 1 are formed between the continuous extrusion nozzle 32 and the die wheel 31 from the molten resin which is extruded to the peripheral surface of the die wheel 31, and at the same time, the first engagement element 21, the longitudinal protective wall section 12, the lateral protective wall section 13 and the like are sequentially formed by the molding cavities 31a.

Further, the molten resin material is extruded from the continuous extrusion nozzle 32 and, at the same time, the zigzag monofilament 5 and the linear magnetic material 7 are supplied from the supply portions 34 and 35 to positions where the molten resin is extruded, and they are integrally molded on the primary surface fastener member.

The primary surface fastener member formed on the peripheral surface of the die wheel 31 is carried by the peripheral surface of the die wheel 31, the primary surface fastener member is half-turned while being cooled, and is solidified. After that, the primary surface fastener member is continuously peeled off from the peripheral surface of the die wheel 31 by the pickup roller 33.

At that time, the first lateral wall section 14 of the lateral protective wall section 13 includes the continuous lateral wall body 14a which does not have the engagement element, and an upper end of the second lateral wall section 15 is divided by the plurality of divided lateral wall bodies 15a and the plurality of second engagement elements 22. Hence, when the primary surface fastener member is peeled off from the peripheral surface of the die wheel 31, the lateral protective wall section 13 can smoothly be pulled out from the molding cavities 31a of the die wheel 31, and it is possible to stably form the lateral protective wall section 13 into a predetermined shape without generating such a trouble that a portion of the lateral protective wall section 13 is cut.

Next, the primary surface fastener member which is peeled off from the die wheel 31 is conveyed toward the cutting portion 36, a predetermined range of the primary surface fastener member other than the monofilament 5 is cut and removed by the cutting portion 36. More specifically, a predetermined portion of the primary surface fastener member placed between the adjacent lateral protective wall sections 13 except the monofilament 5 is entirely cut along the width direction. Accordingly, the molded surface fastener 1 of the first embodiment as shown in FIG. 1 is produced. In the invention, the producing device and the producing method of the molded surface fastener 1 are not specifically limited, and they can freely be changed.

The molded surface fastener 1 of the first embodiment obtained in this manner is integrally molded on the cushion body (foam), such as a seat of a car, and is used.

In order to integrally mold the molded surface fastener 1 of the first embodiment on the cushion body, the molded surface fastener 1 having a necessary length is placed on and fixed to a cavity surface of a mold which is for molding the cushion body.

Figure 6:
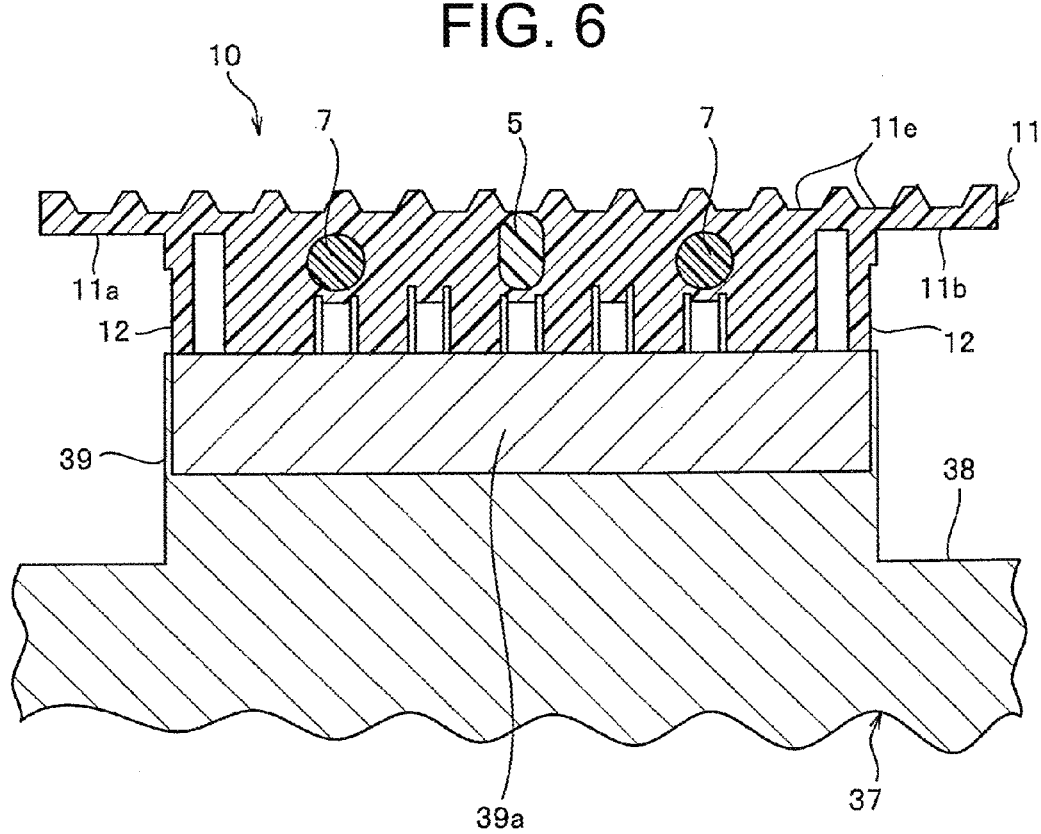
FIG. 6 is a sectional view illustrating a state when the molded surface fastener is fixed to a convex portion of a mold.

At that time, when the cushion body is provided with a concave groove (trench portion) for mounting the molded surface fastener 1 and the molded surface fastener 1 is fixed in the concave groove, a convex portion 39 corresponding to the concave groove of the cushion body is formed on a cavity surface 38 of a mold 37 as shown in FIG. 6, and a magnet 39a such as a neodymium magnet is buried in a top surface (tip end surface) of the convex portion 39.

Hence, the molded surface fastener 1 is placed in such a direction that an upper surface thereof on which the first and second engagement elements 21 and 22 stand faces the top surface of the convex portion 39. Accordingly, the linear magnetic materials 7 placed in the molded surface fastener 1 are attracted by an attraction force of the magnet 39a, and the molded surface fastener 1 is attracted by and fixed to the flat top surface of the convex portion 39.

At that time, the molded surface fastener 1 is held in a state where upper surfaces of the first engagement elements 21, the longitudinal protective wall section 12 and the lateral protective wall sections 13 in the surface fastener member 10 are in close contact with a top surface of a projection formed on the cavity surface 38. By utilizing a magnetic force generated between the magnet 39a which is buried in the convex portion 39 and the linear magnetic material 7 of the molded surface fastener 1, a self-alignment effect capable of automatically matching the molded surface fastener 1 with a predetermined position of the convex portion 39 is obtained.

In the molded surface fastener 1 of the first embodiment, the connecting portion 6 is flexible and each of the surface fastener members 10 can curve in the front-surface/back-surface direction. Hence, the entire molded surface fastener 1 can easily bend in an arc form in the width direction and the front-surface/back-surface direction. Hence, when the convex portion 39 formed on the mold 37 which is for molding the cushion body is placed, for example, such that the convex portion 39 curves in the width direction or the front-surface/back-surface direction or that the convex portion 39 meanders in a zigzag form in the width direction, it is possible to stably fix the molded surface fastener 1 along the top surface of the curved or meandering convex portion 39, and it is possible to prevent gaps from being formed between a top surface of the convex portion 39 and the longitudinal protective wall section 12 and the lateral protective wall section 13 of each of the surface fastener members 10.

After the molded surface fastener 1 of the first embodiment is attracted by and fixed to the predetermined position of the mold 37 as described above, foam resin material of the cushion body is injected from the injection nozzle (not shown) while moving the injection nozzle relative to the mold 37. Accordingly, the foam resin material is injected into every hole and corner of the cavity surface of the mold 37. After a predetermined amount of foam resin material is injected from the injection nozzle, the mold 37 is clamped. Accordingly, the foam resin material is sent into an entire space of the cavity surface of the mold 37 while foaming, and the cushion body is molded.

At that time, since the molded surface fastener 1 is positioned at and fixed to a predetermined position by the attracting effect of the magnet 39a which is buried in the mold 37, the position of the molded surface fastener 1 is not moved by flowing motion and foaming pressure of the foam resin material. Further, since the upper surfaces of the longitudinal protective wall section 12 and the lateral protective wall section 13 (especially, first lateral wall section 14) of the surface fastener member 10 are in close contact with the top surface of the convex portion 39 of the mold 37, gaps through which foam resin material can pass are not formed between the surface fastener member 10 and the top surface of the convex portion 39. Hence, it is possible to prevent the foam resin material which flows in the cavity from flowing over the longitudinal protective wall section 12 and the first lateral wall section 14 of the surface fastener member 10 and from entering the engagement element region.

Even if the longitudinal protective wall section 12 and the first lateral wall section 14 of the surface fastener member 10 are in close contact with the convex portion 39 of the mold 37, for example, if there is a portion where contact between the longitudinal protective wall section 12 and the first lateral wall section 14 of the surface fastener member 10 and the top surface of the convex portion 39 of the mold 37 is weak, foam resin material could flow over the first lateral wall section 14 from between the first lateral wall section 14 of the surface fastener member 10 and the top surface of the convex portion 39 of the mold 37 when the foam resin material injected from the injection nozzle strongly collides directly against the first lateral wall section 14 of the molded surface fastener 1 or when viscosity of the foam resin material is low.

More specifically, since the molded surface fastener 1 of the first embodiment is fixed along the convex portion 39 of the mold 37 when the cushion body is foamed and molded as shown in FIG. 6, for example, when the foam resin material collides against the longitudinal protective wall section 12 of the surface fastener member 10, the foam resin material can escape downward (i.e., to left and right sides of the convex portion 39) while hitting the longitudinal protective wall section 12 of the surface fastener member 10. Therefore, even if the foam resin material collides, since the longitudinal protective wall section 12 having the first and second longitudinal wall sections 18 and 19 of the surface fastener member 10 can release a portion of pressure of the foam resin material, it is possible to relatively stably prevent entry of the foam resin material.

On the other hand, around the first lateral wall section 14 of the surface fastener member 10, there is no space into which foam resin material is released when the foam resin material collides. Therefore, pressure of the foam resin material cannot appropriately be released, and the foam resin material is prone to strongly collide against the first lateral wall section 14 of the surface fastener member 10 as compared with the longitudinal protective wall section 12. Hence, when foam resin material injected from the injection nozzle directly collides, or when viscosity of foam resin material is low, there is a higher risk that the foam resin material flows over the first lateral wall section 14 of the surface fastener member 10 as compared with that of the longitudinal protective wall section 12.

However, according to the molded surface fastener 1 of the first embodiment, since the lateral protective wall section 13 of the surface fastener member 10 includes the first and second lateral wall sections 14 and 15, the second lateral wall section 15 placed inward of the first lateral wall section 14 can prevent the foam resin material from entering the engagement element region even if the foam resin material flows over the first lateral wall section 14.

Especially in this case, inflow pressure of foam resin material which flows over the first lateral wall section 14 is not great. Therefore, even if the second lateral wall section 15 includes the plurality of divided lateral wall bodies 15*a* and the plurality of second engagement elements 22 as described above, the second lateral wall section 15 can prevent foam resin material from entering, and it is possible to prevent the first and second engagement elements 21 and 22 from being buried in the foam resin.

Thereafter, if the foam resin material foams and solidifies in the cavity surface of the mold 37 and the molding operation is completed, a cushion body on which the molded surface fastener 1 of the embodiment is integrally molded can be obtained.

According to the cushion body having the molded surface fastener 1 produced in this manner, since foam does not enter the engagement element region (especially, forming region of the first engagement element 21) of each of the surface fastener members 10 of the molded surface fastener 1, it is possible to stably secure a desired engaging/connecting force by the plurality of first and second engagement elements 21 and 22 which are exposed on the upper surface.

Especially in the molded surface fastener 1 of the first embodiment, since the second engagement element 22 is placed on the second lateral wall section 15 of the lateral protective wall section 13, the engagement element regions of the first and second engagement elements 21 and 22 can efficiently and widely be formed in each of the surface fastener members 10 having the given size in the longitudinal direction over a range from the front second lateral wall section 15 to the rear second lateral wall section 15. Accordingly, it is possible to stably engage other members such as covering material even in the front and rear end edges of the surface fastener member 10. It is also possible to increase the number of first engagement elements 21 formed on each of the surface fastener members 10, and to further enhance the engaging/connecting force of the surface fastener member 10.

Therefore, if covering material is put on a surface of the cushion body produced in the above-described manner and the covering material is pressed toward a mounting position of the molded surface fastener 1 which is integrally formed on the cushion body, female engagement elements placed on a back surface of the covering material can stably be engaged with the first and second engagement elements 21 and 22 of the molded surface fastener 1. According to this, it is possible to bring the covering material into close contact along a surface of the cushion body and to precisely mount the covering material without floating up the covering material from the cushion body.

Second Embodiment

Figure 7:
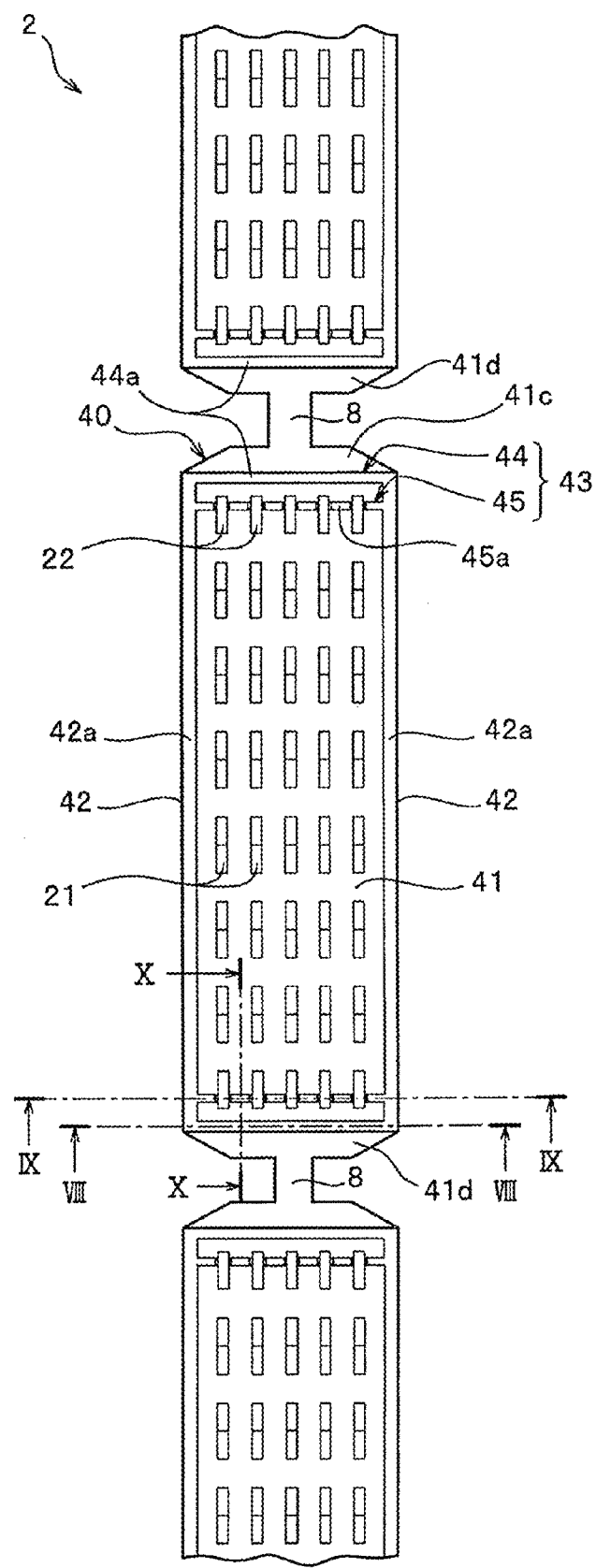
FIG. 7 is a plan view illustrating a molded surface fastener according to a second embodiment of the invention.
Figure 8:
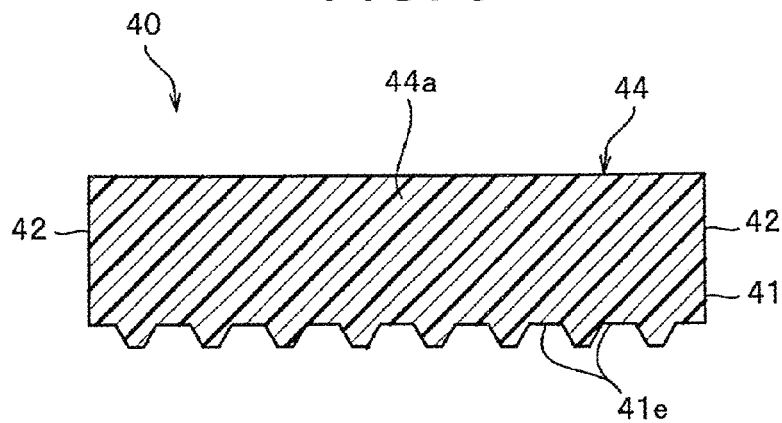
FIG. 8 is a sectional view taken along line VIII-VIII in FIG. 7 as viewed from arrows.
Figure 9:
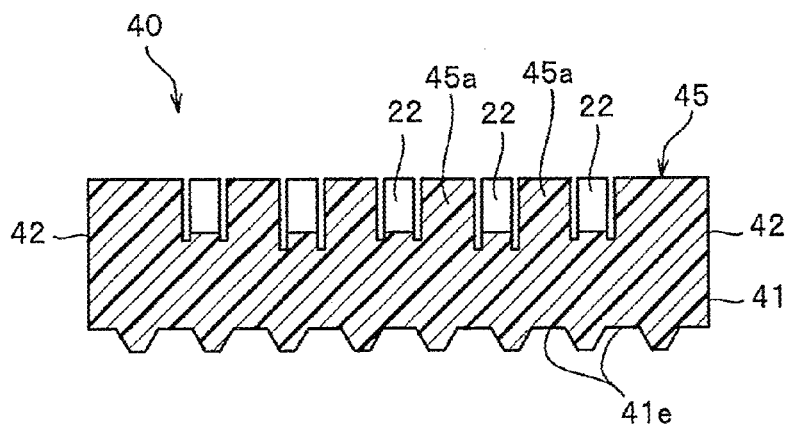
FIG. 9 is a sectional view taken along line IX-IX in FIG. 7 as viewed from arrows.
Figure 10:
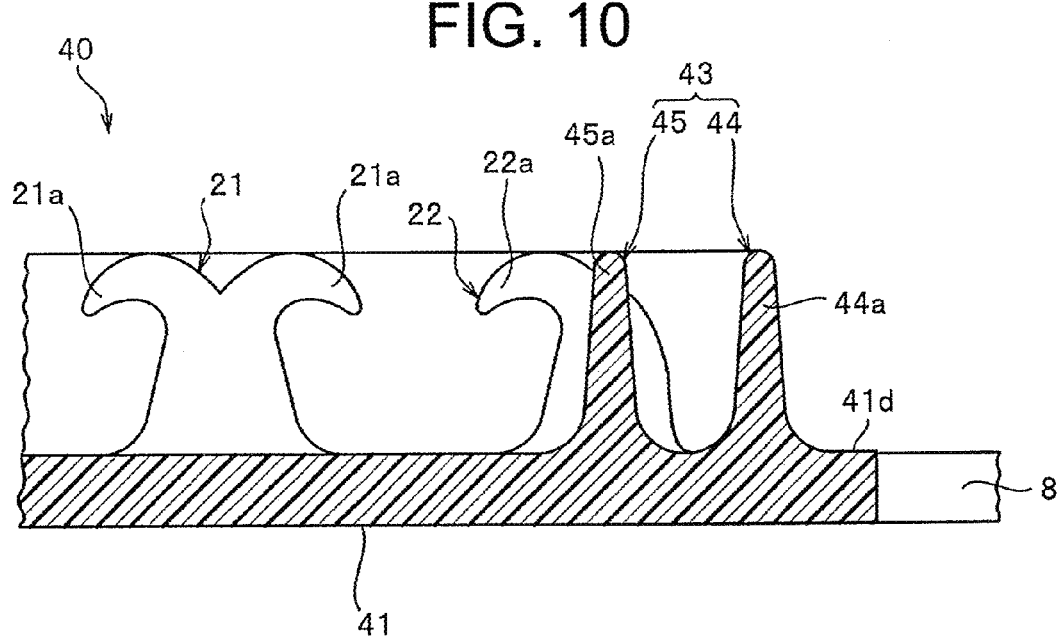
FIG. 10 is a sectional view taken along line X-X in FIG. 7 as viewed from arrows.

FIG. 7 is a plan view illustrating a molded surface fastener according to a second embodiment, and FIGS. 8, 9 and 10 are sectional views respectively taken along line VII-VII, line IX-IX and line X-X in FIG. 7 as viewed from arrows.

In molded surface fasteners according to the second to fourth embodiments which will be described below, configurations which are different from those of the molded surface fastener of the first embodiment will mainly be described. The same reference signs are allocated to parts and members having substantially the same configurations as those of the molded surface fastener of the first embodiment, and description thereof will not be repeated.

The molded surface fastener 2 according to the second embodiment includes a plurality of surface fastener members 40, and flexible connecting portions 8 which connect the surface fastener members 40 to each other along the longitudinal direction. Flat plate-shaped base materials 41 of the surface fastener members 40 which are adjacent to each other are connected to each other through the connecting portion 8. The connecting portion 8 of the second embodiment does not include the monofilament 5 unlike the first embodiment, and the connecting portion 8 is integrally formed on the flat plate-shaped base material 41 using the same thermal plasticity synthetic resin as that of the surface fastener member 40.

Each of the surface fastener members 40 includes the flat plate-shaped base material 41, left and right longitudinal protective wall sections 42 standing on an upper surface of the flat plate-shaped base material 41, front and rear lateral protective wall sections 43 placed along the width direction between the left and right longitudinal protective wall sections 42, a plurality of first engagement elements 21 standing in a region located inward of the longitudinal protective wall section 42 and the lateral protective wall section 43, and a plurality of second engagement elements 22 placed in the lateral protective wall section 43.

In the second embodiment, the surface fastener member 40 is provided with magnetic property by mixing or kneading magnetic particles in synthetic resin which configures the surface fastener member 40. Accordingly, when a cushion body is foamed and molded using a mold in which a magnet is placed on the cavity surface or in the vicinity of the cavity surface, it is possible to stably attract and fix the molded surface fastener 2 to the cavity surface of the mold by utilizing a magnetic force generated between the magnet of the mold and the surface fastener member 40.

The flat plate-shaped base material 41 of the surface fastener member 40 has a thin flat plate shape so that the flat plate-shaped base material 41 can curve in the vertical direction (front-surface/back-surface direction). The flat plate-shaped base material 41 has a forwardly extending portion 41*c* extending more forward from the front lateral protective wall section 43, and a rearwardly extending portion 41*d* extending more rearward from the rear lateral protective wall section 43. A plurality of concave grooves 41*e* placed along the longitudinal direction are formed in a lower surface of the flat plate-shaped base material 41.

The left and right longitudinal protective wall sections 42 in the second embodiment stand on the left and right side edges of the flat plate-shaped base material 41 along the longitudinal direction such that the longitudinal protective wall sections 42 sandwich engagement element regions of the first and second engagement elements 21 and 22. Each of the longitudinal protective wall sections 42 includes a row of continuous longitudinal wall body 42a which continuously stands along the longitudinal direction at a given height from the flat plate-shaped base material 41.

The first engagement elements 21 have the same style as that of the first engagement elements 21 of the first embodiment, the first engagement elements 21 of the second embodiment are arrayed in a region surrounded by the longitudinal protective wall sections 42 and the lateral protective wall sections 43 at a predetermined mounting pitch in the longitudinal direction and the width direction, and the first engagement elements 21 stand on the upper surface of the flat plate-shaped base material 41.

The front and rear lateral protective wall sections 43 stand on front and rear end edges of the flat plate-shaped base material 41 along the width direction of the surface fastener member 40 between the left and right longitudinal protective wall sections 42. The lateral protective wall sections 43 include first lateral wall sections 44 placed on front and rear end edges of the flat plate-shaped base material 41, and second lateral wall sections 45 placed such that they are separated from the first lateral wall sections 44 on the inner side of the first lateral wall sections 44 (closer to forming region of first engagement element 21). In this case, a distance between the first lateral wall section 44 and the second lateral wall section 45 is set smaller than a mounting pitch of the first engagement elements 21 in the longitudinal direction.

As shown in FIG. 8, the first lateral wall section 44 includes a continuous lateral wall body 44a which continuously stands at a given height from the flat plate-shaped base material 41 between the left and right continuous longitudinal wall bodies 42a. This continuous lateral wall body 44a is straightly placed along the width direction of the surface fastener member 40, and is connected to the left and right continuous longitudinal wall bodies 42a.

As shown in FIG. 9, the second lateral wall section 45 includes a plurality of divided lateral wall bodies 45a intermittently standing at a given height from the flat plate-shaped base material 41 along the width direction of the surface fastener member 40 between the left and right longitudinal protective wall sections 42, and a plurality of second engagement elements 22 which are placed between the divided lateral wall bodies 45a and which configure the second lateral wall section 45 together with the divided lateral wall bodies 45a.

In this case, the divided lateral wall bodies 45a which are placed on a leftmost side and a rightmost side of the second lateral wall section 45 are respectively connected to left and right continuous longitudinal wall bodies 42a. The second engagement elements 22 have the same style as that of the second engagement elements 22 of the first embodiment. In the second lateral wall section 45, the divided lateral wall body 45a and the second engagement element 22 which are adjacent to each other are formed such that their lower ends are connected to each other, and their upper ends are separated from each other by a small distance.

In the second embodiment, heights of the continuous longitudinal wall bodies 42a of the longitudinal protective wall section 42, the first engagement elements 21, the continuous lateral wall body 44a of the first lateral wall section 44, and the divided lateral wall bodies 45a and the second engagement element 22 of the second lateral wall section 45 from the upper surface of the flat plate-shaped base material 41 are set equal to each other, and positions of their upper ends are located on the same plane in a state where the surface fastener member 40 is not curved.

The molded surface fastener 2 of the second embodiment having the above-described configuration can be produced in the same manner as that of the first embodiment by using a producing device 30 provided with a die wheel 31 including a peripheral surface in which a molding cavities 31a having predetermined shapes are formed.

In the second embodiment, the first lateral wall section 44 of the lateral protective wall section 43 includes the continuous lateral wall body 44a which does not have an engagement element, and the upper end of the second lateral wall section 45 is divided by the plurality of divided lateral wall bodies 45a and the plurality of second engagement elements 22. Therefore, when the lateral protective wall section 43 is pulled out from the molding cavities 31a of the die wheel 31, it is possible to stably form the lateral protective wall section 43 into a predetermined shape without generating such a trouble that a portion of the lateral protective wall section 43 is cut.

The molded surface fastener 2 of the second embodiment is integrally molded with the cushion body such as a seat of a car. In this case, according to the molded surface fastener 2 of the second embodiment, when the cushion body is foamed and molded, it is possible to prevent foam resin material from entering the engagement element regions of the first and second engagement elements 21 and 22 by the longitudinal protective wall section 42 and the first lateral wall section 44 of the surface fastener member 40 like the first embodiment.

Even if foam resin material strongly collides against the first lateral wall section 44 of the molded surface fastener 2 and the foam resin material flows over the first lateral wall section 44, it is possible to stably prevent the foam resin material from entering the forming region of the first engagement element 21 by the second lateral wall section 45 placed inside the first lateral wall section 44.

Therefore, also in the second embodiment, like the first embodiment, since the foam resin material does not enter the engagement element regions of the first and second engagement elements 21 and 22 of the surface fastener member 40, the molded surface fastener 2 which is integrally molded with the cushion body can stably secure a desired engaging/connecting force by the plurality of first and second engagement elements 21 and 22.

Further, according to the molded surface fastener 2 of the second embodiment, it is possible to efficiently and widely form the engagement element regions of the first and second engagement elements 21 and 22 over a range from the front second lateral wall section 45 to the rear second lateral wall section 45. Accordingly, it is possible to stably engage other members such as covering material even in the front and rear end edges of the surface fastener member 40. It is also possible to increase the number of first engagement elements 21 formed on each of the surface fastener members 40, and to further enhance the engaging/connecting force of the surface fastener member 40.

Third Embodiment

Figure 11:
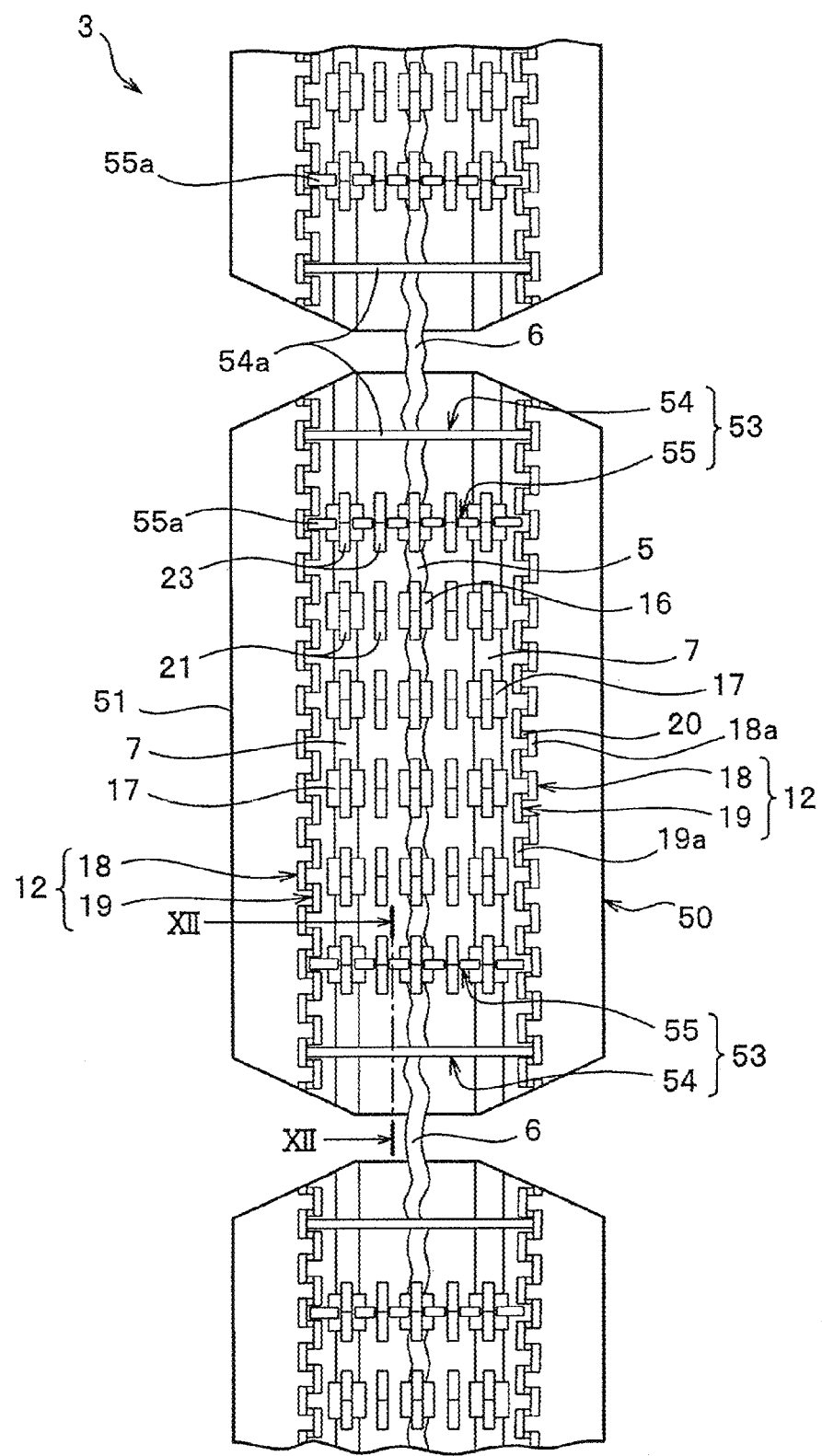
FIG. 11 is a plan view illustrating a molded surface fastener according to a third embodiment of the invention.
Figure 12:
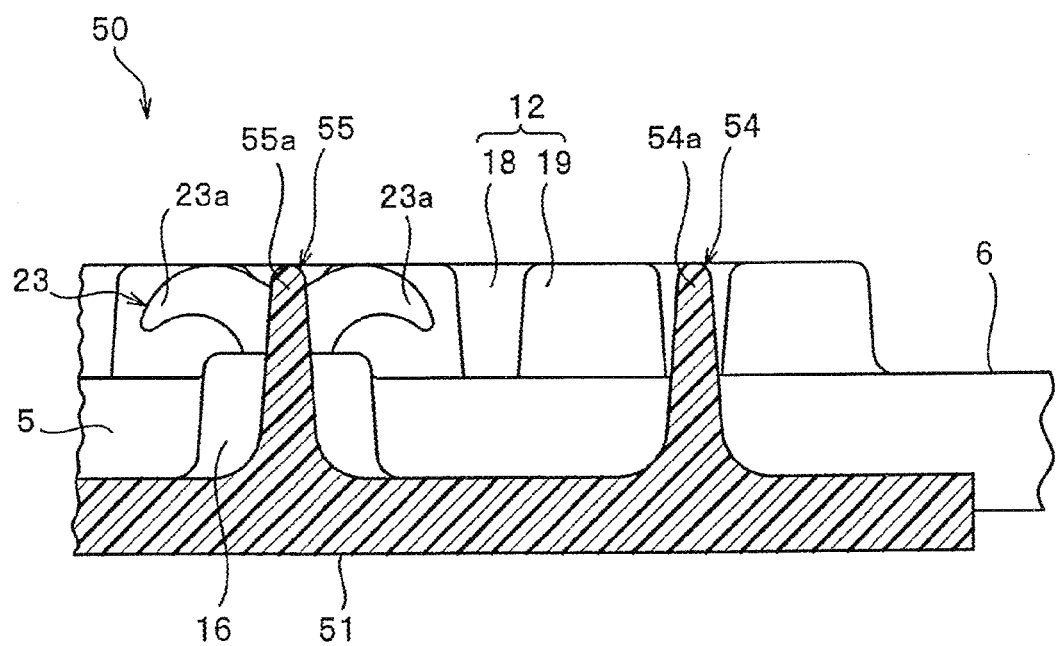
FIG. 12 is a sectional view taken along line XII-XII in FIG. 11 as viewed from arrows.

FIG. 11 is a plan view illustrating a molded surface fastener according to a third embodiment, and FIG. 12 is a sectional view taken along line XII-XII in FIG. 11 as viewed from arrows.

The molded surface fastener 3 according to the third embodiment includes a plurality of surface fastener members 50, monofilaments 5 configuring connecting portions 6 which connect the surface fastener members 50 to each other along the longitudinal direction, and linear magnetic materials 7 fixed to the molded surface fastener 3 along the longitudinal direction.

The molded surface fastener 3 of the third embodiment is configured substantially in the same manner as the molded surface fastener 1 of the first embodiment except that configurations of lateral protective wall sections 53 in each of the surface fastener members 50 are different and that an area of a forming region of a first engagement element 21 becomes relatively small (in other words, forming density of first engagement element 21 becomes high). Therefore, in the third embodiment, the lateral protective wall sections 53 of the surface fastener member 50 will mainly be described.

The lateral protective wall sections 53 of the third embodiment include first lateral wall sections 54 placed on front and rear end edges of the flat plate-shaped base material 51, and second lateral wall sections 55 which are placed on an inside of the first lateral wall section 54 (closer to the engagement element region) such that the second lateral wall sections 55 are separated from the first lateral wall sections 54.

In this case, although each of the first lateral wall sections 54 of the third embodiment is placed substantially at the same position as the first embodiment with respect to the flat plate-shaped base material 51, the second lateral wall section 55 is placed at a location closer to an inner side with respect to the flat plate-shaped base material 51 in the longitudinal direction as compared with the first embodiment, and a distance between the first lateral wall section 54 and the second lateral wall section 55 is set equal to a mounting pitch of the first engagement elements 21 in the longitudinal direction.

Accordingly, although an area of the forming region of the first engagement element 21 becomes relatively small as compared with the first embodiment, since the distance between the first lateral wall section 54 and the second lateral wall section 55 becomes long, a style of a second engagement element 23 placed in the second lateral wall section 55 can be made the same as that of the first engagement element 21 having the bifurcated engaging heads 21a. In this case, engagement element regions of the first and second engagement elements 21 and 23 of the third embodiment is formed such that they spread more outward than a position of later-described divided lateral wall bodies 55a of the second lateral wall section 55 in the longitudinal direction.

The distance between the first lateral wall section 54 and the second lateral wall section 55 becomes long. Therefore, even if foam resin material flows over the first lateral wall section 54 and enters between the first lateral wall section 54 and the second lateral wall section 55 when a cushion body is foamed and molded, it is possible to make the foam resin material which flows over the first lateral wall section 54 stay in a region between the first lateral wall section 54 and the second lateral wall section 55. Hence, it is possible to effectively prevent foam resin material from overflowing from the region between the first lateral wall section 54 and the second lateral wall section 55, and from entering the forming region of the first engagement element 21.

Each of the first lateral wall sections 54 of the third embodiment includes a continuous lateral wall body 54a which continuously stands at a given height from the flat plate-shaped base material 51 between the left and right longitudinal protective wall sections 12. The continuous lateral wall body 54a is straightly placed along the width direction of the surface fastener member 50, and is connected to the longitudinal wall body 19a of the second longitudinal wall section 19 in the longitudinal protective wall section 12. In this case, the height of the continuous lateral wall body 54a from an upper surface of the flat plate-shaped base material 51 is set equal to heights of the first engagement element 21 and the longitudinal wall bodies 18a and 19a of the first and second longitudinal wall sections 18 and 19 which configure the longitudinal protective wall section 12.

Each of the second lateral wall sections 55 of the third embodiment includes a plurality of divided lateral wall bodies 55a which intermittently stand at a given height from the flat plate-shaped base material 51 along the width direction of the surface fastener member 50 between the left and right longitudinal protective wall sections 12, and a plurality of the second engagement elements 23 which are placed between the divided lateral wall bodies 55a and which configure the second lateral wall sections 55 together with the divided lateral wall bodies 55a.

In this case, each of the second engagement elements 23 includes a standing portion (not shown) which stands from the upper surface of the flat plate-shaped base material 51, and a pair of engaging heads 23a which branches off from an upper end of the standing portion in a bifurcated form in the longitudinal direction and which curves in a hook form. The second engagement element 23 is formed into the same style as the first engagement element 21. That is, in the third embodiment, since a region between the first lateral wall section 54 and the second lateral wall section 55 is formed wide, the second engagement element 23 can include not only the engaging head 23a which extends toward the forming region of the first engagement element 21, but also the engaging head 23a which extends toward the first lateral wall section 54. Therefore, an engaging/connecting force of the second lateral wall section 55 is enhanced.

In the second lateral wall section 55, lower ends of the divided lateral wall body 55a and the second engagement element 23 which are adjacent to each other are connected to each other, and upper ends of both the members are separated from each other by small distance. In the second lateral wall section 55, heights of the divided lateral wall body 55a and the second engagement element 23 from the upper surface of the flat plate-shaped base material 51 are set equal to each other, and are set equal to heights of the first engagement element 21, the continuous lateral wall body 54a and the longitudinal wall bodies 18a and 19a of the first and second longitudinal wall sections 18 and 19 which configure the longitudinal protective wall section 12.

According to the molded surface fastener 3 of the third embodiment having such a lateral protective wall section 53, when the cushion body is foamed and molded, it is possible to prevent foam resin material from entering the engagement element region by the longitudinal protective wall section 12 and the first lateral wall section 54 of the surface fastener member 50 like the first and second embodiments.

Further, even if foam resin material strongly collides against the first lateral wall section 54 of the molded surface fastener 3 and the foam resin material flows over the first lateral wall section 54, it is possible to stably prevent the foam resin material from entering the forming region of the first engagement element 21 by the second lateral wall section 55 which is placed on the inner side of the first lateral wall section 54.

Figure 13:
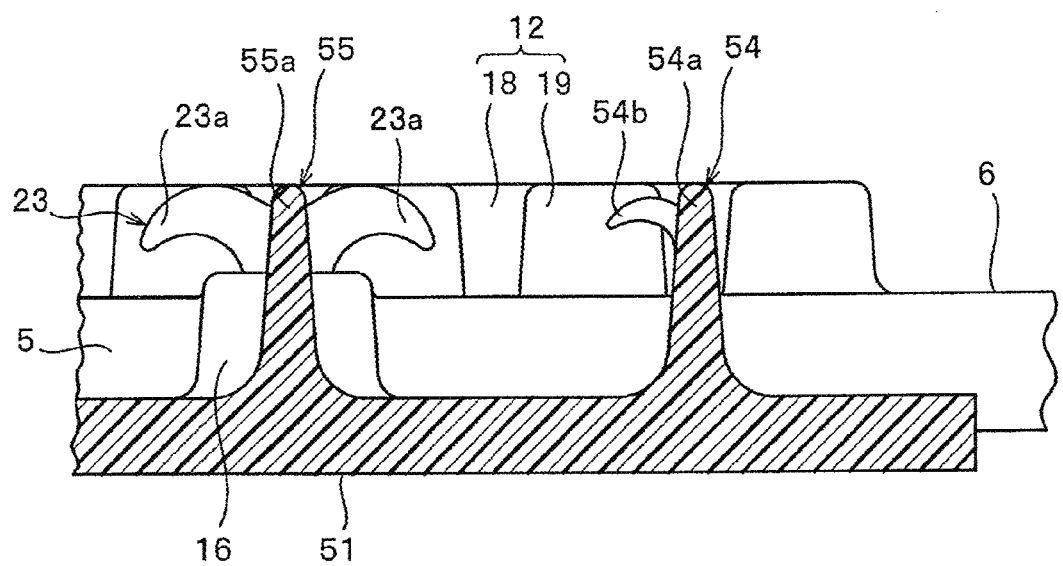
FIG. 13 is a sectional view illustrating a molded surface fastener according to a modification of the third embodiment.

According to the molded surface fastener 3 of the third embodiment, since a distance between the first lateral wall section 54 and the second lateral wall section 55 is long, the continuous lateral wall body 54a which configures the first lateral wall section 54 can be provided with a cantilever engaging head 54b which curves into a hook shape toward the second lateral wall section 55 from an upper end of the continuous lateral wall body 54a as shown in FIG. 13 for example. Alternatively, it is also possible to provide a pair of front and rear engaging heads (not shown) which branches off in a bifurcated form from the upper end of the continuous lateral wall body 54a in the longitudinal direction and which curves in a hook form. Accordingly, since the first lateral wall section 54 can also be provided with an engaging/connecting force, it is possible to enhance the engaging/connecting force at the front and rear end edges of the surface fastener member 50.

When the continuous lateral wall body 54a of the first lateral wall section 54 is provided with the cantilever engaging head 54b or the pair of front and rear engaging heads 54b, the continuous lateral wall body 54a is continuously formed between the left and right longitudinal protective wall sections 12. Therefore, in producing the molded surface fastener 3, when the first lateral wall section 54 is pulled out from the molding cavities 31a of the die wheel 31, there is a possibility that the engaging head 54b provided on the continuous lateral wall body 54a cannot easily be pulled out from the molding cavities 31a. Therefore, a size and a shape of the engaging head 54b provided on the continuous lateral wall body 54a are limited to some extent.

Fourth Embodiment

Figure 14:
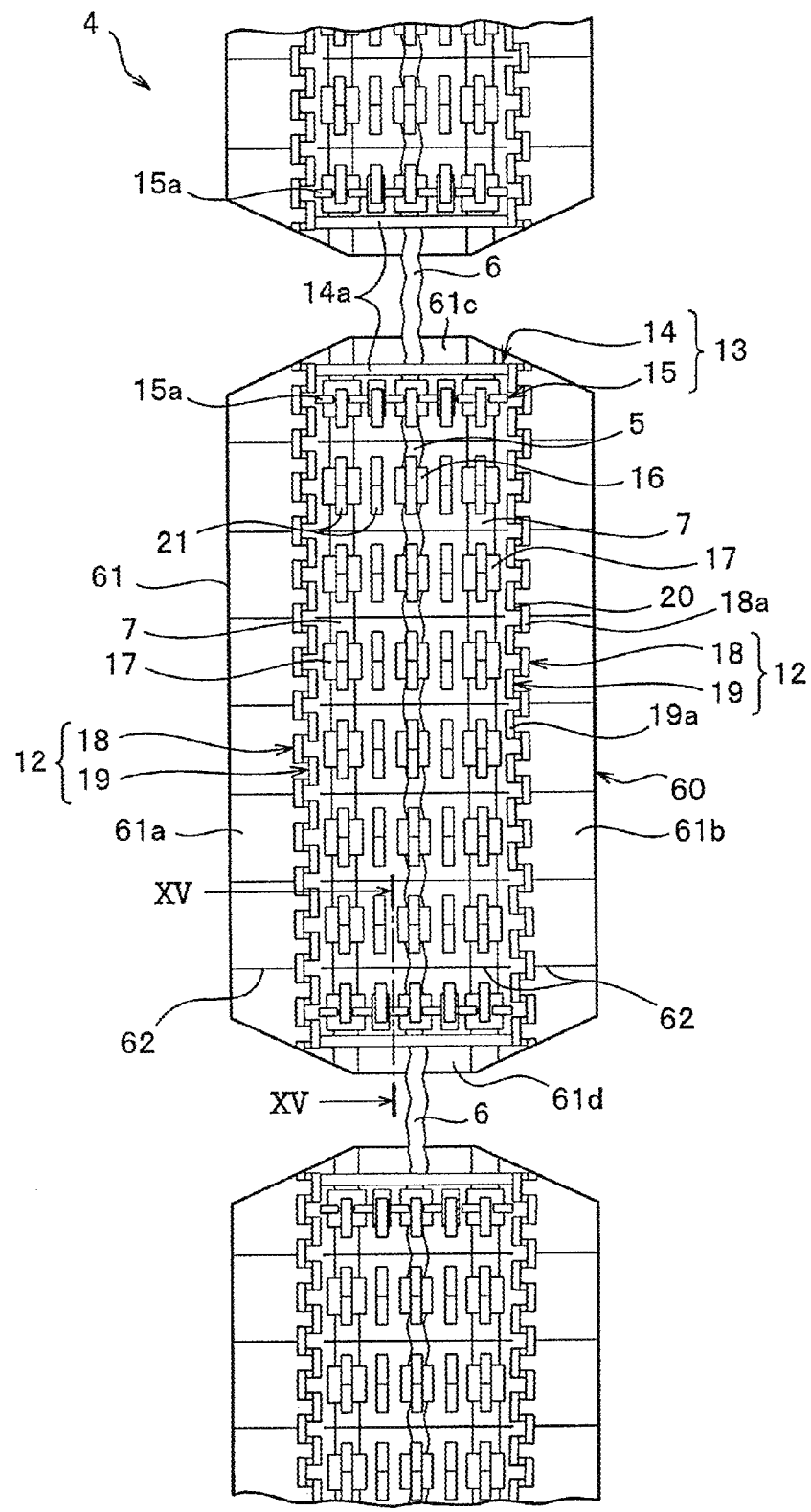
FIG. 14 is a plan view illustrating a molded surface fastener according to a fourth embodiment of the invention.
Figure 15:
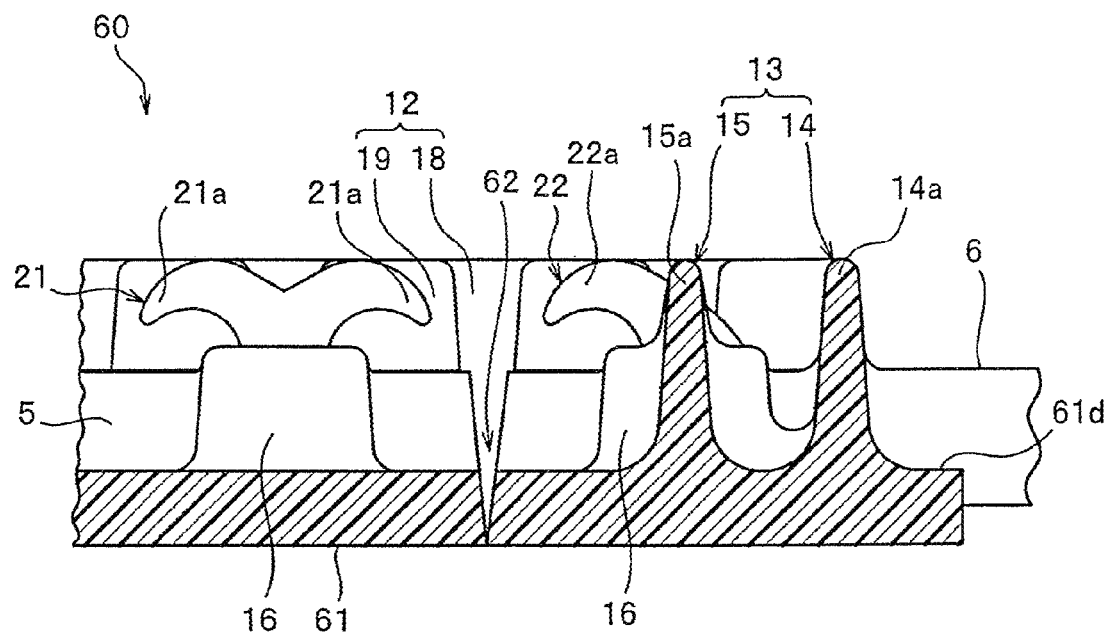
FIG. 15 is a sectional view taken along line XV-XV in FIG. 14 as viewed from arrows.
Figure 16:
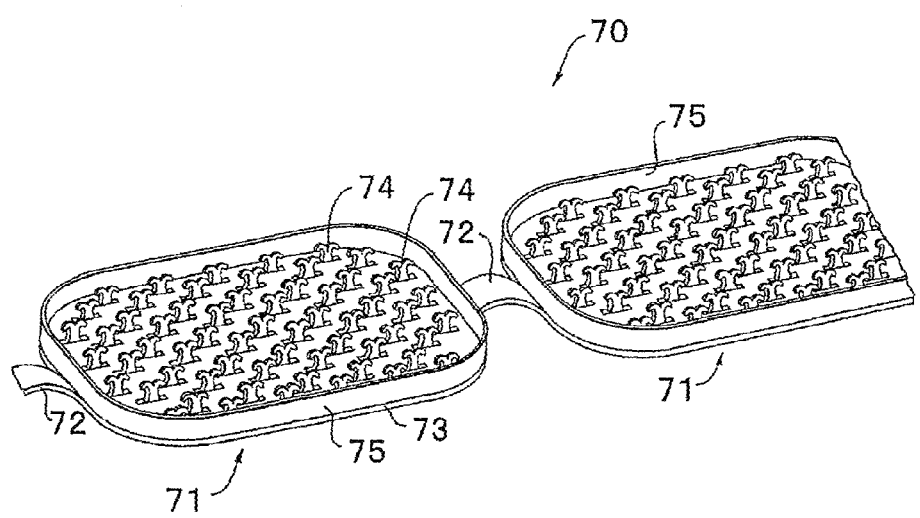
FIG. 16 is a perspective view illustrating a conventional molded surface fastener.
Figure 17:
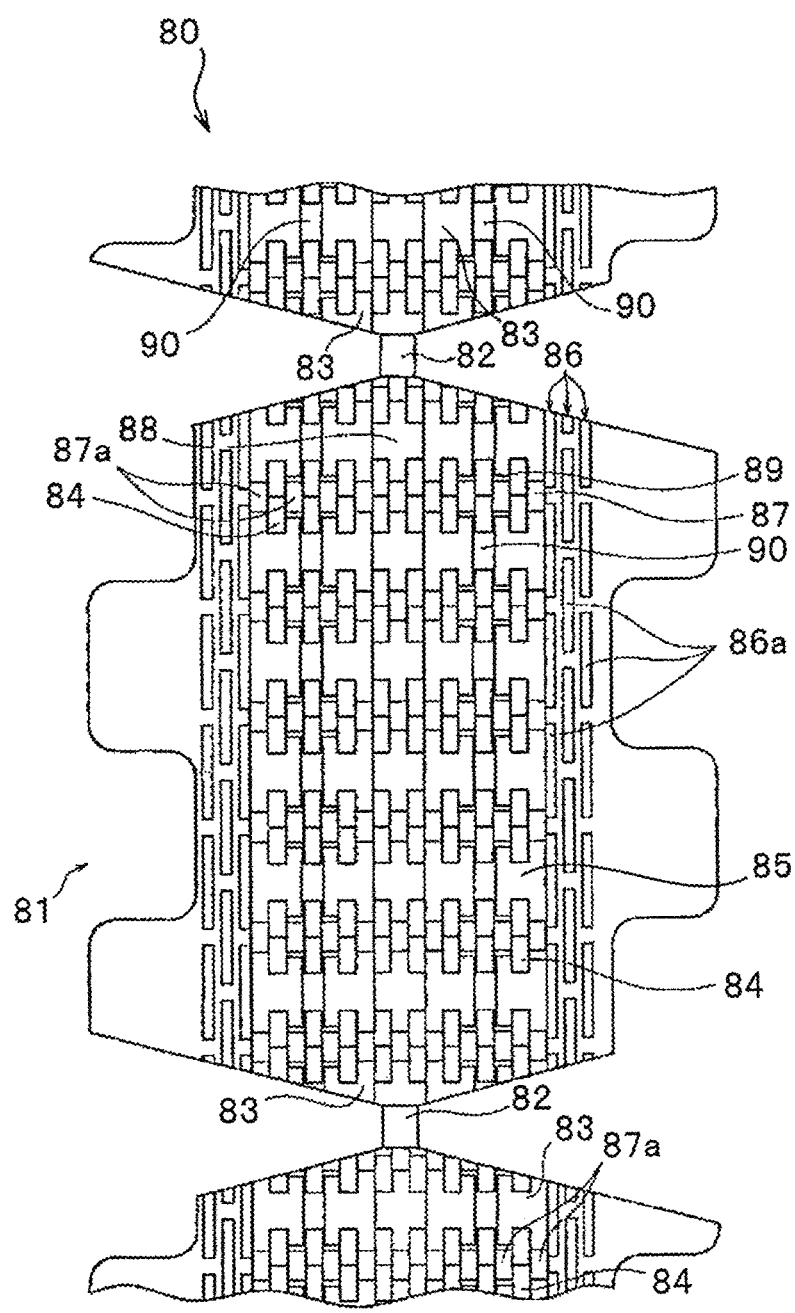
FIG. 17 is a plan view illustrating another conventional molded surface fastener.

FIG. 14 is a plan view illustrating a molded surface fastener according to a fourth embodiment, and FIG. 15 is a sectional view taken along line XV-XV in FIG. 14 as viewed from arrows.

The molded surface fastener 4 of the fourth embodiment is configured substantially in the same manner as the molded surface fastener 1 of the first embodiment except that a plurality of slits 62 are formed in each of surface fastener members 60 in the width direction.

More specifically, each of the surface fastener members 60 of the fourth embodiment includes a flat plate-shaped base material 61, left and right longitudinal protective wall sections 12 standing on the flat plate-shaped base material 61, and front and rear lateral protective wall sections 13 placed along the width direction between the left and right longitudinal protective wall sections 12.

A thickness of the flat plate-shaped base material 61 is thin so that it can be curved in the vertical direction. The flat plate-shaped base material 61 includes left and right laterally extending portions 61a and 61b outwardly extending in the width direction from the left and right longitudinal protective wall sections 12, a forwardly extending portion 61c extending more forward from the front lateral protective wall section 13, and a rearwardly extending portion 61d extending more rearward from the rear lateral protective wall section 13.

In each of the surface fastener members 60 having such a flat plate-shaped base material 61, the plurality of slits 62 arrayed along the width direction of the surface fastener member 60 are formed in parallel to each other. In this case, each of the slits 62 formed in the surface fastener member 60 is placed at an intermediate portion between the first engagement elements 21 which are adjacent to each other, and at an intermediate portion between the first engagement element 21 and the second engagement element 22 which are adjacent to each other with respect to a position of the surface fastener member 60 in the longitudinal direction.

Each of the slits 62 is placed in a region between the left and right longitudinal protective wall sections 12 in the flat plate-shaped base material 61, and in regions of the left and right laterally extending portions 61a and 61b in the flat plate-shaped base material 61. The slit 62 is not placed in regions where the left and right longitudinal protective wall sections 12 are formed.

In this case, as shown in FIG. 15, each of the slits 62 is formed such that it penetrates the flat plate-shaped base material 61 from its upper surface toward its lower surface. In the invention, the slits formed in the flat plate-shaped base material 61 may not penetrate the flat plate-shaped base material 61, and the flat plate-shaped base material 61 may be cut from its upper surface such that the lower surface of the flat plate-shaped base material 61 remains thinly, so that the slit may have a substantially V-shaped cross section.

In the fourth embodiment, a plurality of slits 62 are formed also in a monofilament 5 and a linear magnetic material 7 at a predetermined distance from one another such that the slits 62 cut the monofilament 5 and the linear magnetic material 7. The slits 62 are formed at positions corresponding to positions of the slits 62 formed in the flat plate-shaped base material 61 in the region of the surface fastener member 60.

The slits 62 of the fourth embodiment are formed by inserting a cutter into the surface fastener member 60 from its upper surface and incising the surface fastener member 60 after producing a molded surface fastener using the same method as the first embodiment for example.

Even if the plurality of slits 62 are formed in the flat plate-shaped base material 61 of each of the surface fastener members 60, the slits 62 do not form gaps through which foam resin material can flow through and which penetrate the flat plate-shaped base material 61. Therefore, when a cushion body is foamed and molded, foam resin material does not enter the engagement element region of the surface fastener member 60 through the slits 62 of the flat plate-shaped base material 61.

In each of the surface fastener members 60, even if the slits 62 are formed in the flat plate-shaped base material 61, the monofilament 5 and the linear magnetic material 7 along the width direction, the surface fastener member 60 is not separated into pieces at positions where the slits 62 are formed since the surface fastener member 60 is connected in the longitudinal direction in the regions where the longitudinal protective wall sections 12 are formed.

According to the molded surface fastener 4 of the fourth embodiment, the same effect as that of the molded surface fastener 1 of the first embodiment can be obtained. Further, because the plurality of slits 62 are formed in each of the surface fastener members 60 and because the slits 62 are formed also in the monofilament 5 and the linear magnetic material 7, it is possible to largely enhance flexibility of the surface fastener member 60, and the surface fastener member 60 can easily curve in the front-surface/back-surface direction.

Accordingly, for example, when the molded surface fastener 4 of the fourth embodiment is placed on and fixed to a cavity surface of a mold which molds a cushion body, it is possible to easily curve the surface fastener member 60 along the curved shape of the cavity surface even if the cavity surface is curved into a convex form or concave form. Hence, the longitudinal protective wall section 12 and the lateral protective wall section 13 of each of the surface fastener members 60 can more stably be brought into close contact with the cavity surface, and when the cushion body is foamed and molded, it is possible to more effectively prevent foam resin material from flowing over the longitudinal protective wall section 12 and the lateral protective wall section 13 and from entering the engagement element region.

In the invention, in a case where the slits 62 arrayed along the width direction of the surface fastener member 60 are formed, if at least one slit 62 is formed in each of the surface fastener members 60, there is an effect that flexibility of the surface fastener member 60 is enhanced.

If the slits 62 are formed at least in a region between the left and right longitudinal protective wall sections 12 in the flat plate-shaped base material 61, the effect that flexibility of the surface fastener member 60 is enhanced can be obtained even if the slits 62 are not formed in the regions of the left and right laterally extending portions 61*a* and 61*b*, the monofilament 5 and the linear magnetic material 7. If the slits 62 are formed in the region between the left and right longitudinal protective wall sections 12 and in regions of the left and right laterally extending portions 61*a* and 61*b* in the flat plate-shaped base material 61, it is possible to more effectively enhance the flexibility of the surface fastener member 60. Further, if the slits 62 are formed in the monofilament 5 and the linear magnetic material 7, it is possible to largely enhance the flexibility of the surface fastener member 60.

DESCRIPTION OF REFERENCE NUMERALS

1, 2, 3, 4 molded surface fastener
5 monofilament
6 connecting portion
7 linear magnetic material
8 connecting portion
10 surface fastener member
11 flat plate-shaped base material
11*a* left laterally extending portion
11*b* right laterally extending portion
11*c* forwardly extending portion
11*d* rearwardly extending portion
11*e* concave groove
12 longitudinal protective wall section
13 lateral protective wall section
14 first lateral wall section
14*a* continuous lateral wall body
15 second lateral wall section
15*a* divided lateral wall body
16 first fixing portion
17 second fixing portion
18 first longitudinal wall sections
18*a* longitudinal wall body
19 second longitudinal wall section
19*a* longitudinal wall body
20 wall connecting portion
21 first engagement element
21*a* engaging head
22 second engagement element
22*a* engaging head
23 second engagement element
23*a* engaging head
30 producing device
31 die wheel
31*a* molding cavity
32 continuous extrusion nozzle
33 pickup roller
34 monofilament supply portion
35 linear magnetic material supply portion
36 cutting portion
37 mold
38 cavity surface
39 convex portion
39*a* magnet
40 surface fastener member
41 flat plate-shaped base material
41*c* forwardly extending portion
41*d* rearwardly extending portion
41*e* concave groove
42 longitudinal protective wall section
42*a* continuous longitudinal wall body
43 lateral protective wall section
44 first lateral wall section
44*a* continuous lateral wall body
45 second lateral wall section
45*a* divided lateral wall body
50 surface fastener member
51 flat plate-shaped base material
53 lateral protective wall section
54 first lateral wall section
54*a* continuous lateral wall body
54*b* engaging head
55 second lateral wall section
55*a* divided lateral wall body
60 surface fastener member
61 flat plate-shaped base material
61*a* left laterally extending portion
61*b* right laterally extending portion
61*c* forwardly extending portion
61*d* rearwardly extending portion
62 slit

The invention claimed is:

1. A molded surface fastener comprising
surface fastener members in which a plurality of engagement elements stand on first surfaces of flat plate-shaped base materials, and
flexible connecting portions which connect the plurality of surface fastener members to each other in a longitudinal direction, in which
each of the surface fastener members comprises a pair of left and right longitudinal protective wall sections placed along the left and right side edge portions of the flat plate-shaped base materials, and a pair of front and rear lateral protective wall sections placed on front and rear end edge portions of the flat plate-shaped base materials, and
the molded surface fastener is integrally molded on a surface of a cushion body when the cushion body is foamed and molded, wherein
each of the lateral protective wall sections includes an outer first lateral wall section and an inner second lateral wall section,
the engagement elements include first engagement elements placed in a region surrounded by the longitudinal protective wall sections and the second lateral wall section, and
a distance between the first lateral wall section and the second lateral wall section is set smaller than a mounting pitch of the first engagement elements in the longitudinal direction of the surface fastener member.

2. The molded surface fastener according to claim 1, wherein the engagement elements include second engagement elements directly placed in the second lateral wall section, the second lateral wall section comprises divided lateral wall bodies which are intermittently placed along the width direction between the left and right longitudinal protective wall sections and the second engagement elements are placed between the divided lateral wall bodies, and upper ends of the divided lateral wall bodies and the second engagement elements are separated from each other.

3. The molded surface fastener according to claim 2, wherein each of the second engagement elements includes a standing portion which stands from the first surface of the flat plate-shaped base material, and a cantilever engaging head which curves in a hook shape from an upper end portion of the standing portion toward a forming region of the first engagement element.

4. The molded surface fastener according to claim 2, wherein the divided lateral wall bodies and the second engagement elements are connected to each other at their lower end portions on a side closer to the flat plate-shaped base materials, and are separated from each other at their upper end portions.

5. The molded surface fastener according to claim 3, wherein the first lateral wall section comprises a continuous lateral wall body which is connected to the left and right longitudinal protective wall sections and which continuously stands at a predetermined height from the flat plate-shaped base materials between the left and right longitudinal protective wall sections.

6. The molded surface fastener according to claim 5, wherein the first lateral wall section comprises only the continuous lateral wall body.

7. The molded surface fastener according to claim 1, wherein the surface fastener member includes at least one slit formed in the flat plate-shaped base material along the width direction of the surface fastener member, and the slit is placed between the first engagement elements which are placed at a predetermined mounting pitch in the longitudinal direction of the surface fastener member.

8. The molded surface fastener according to claim 1, wherein the surface fastener member includes a member having magnetic property.

\* \* \* \* \*

UNITED STATES PATENT AND TRADEMARK OFFICE
CERTIFICATE OF CORRECTION

PATENT NO. : 9,781,979 B2
APPLICATION NO. : 15/146400
DATED : October 10, 2017
INVENTOR(S) : Tsuyoshi Minato et al.

Page 1 of 1

It is certified that error appears in the above-identified patent and that said Letters Patent is hereby corrected as shown below:

In the Specification

In Column 11, Line 3, after "line" insert -- III-III --.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*